(12) United States Patent
Patel et al.

(10) Patent No.: US 9,864,133 B2
(45) Date of Patent: Jan. 9, 2018

(54) SILICON PHOTONIC CHIP WITH THROUGH VIAS

(71) Applicant: Cisco Technology ,Inc., San Jose, CA (US)

(72) Inventors: Vipulkumar Patel, Breinigsville, PA (US); Mark Webster, Bethlehem, PA (US); Ravi Tummidi, Breinigsville, PA (US); Mary Nadeau, Alburtis, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/208,658

(22) Filed: Jul. 13, 2016

(65) Prior Publication Data

US 2017/0139132 A1    May 18, 2017

Related U.S. Application Data

(60) Provisional application No. 62/298,228, filed on Feb. 22, 2016, provisional application No. 62/254,929, filed on Nov. 13, 2015.

(51) Int. Cl.
*G02B 6/12* (2006.01)
*G02B 6/34* (2006.01)
(Continued)

(52) U.S. Cl.
CPC ..... *G02B 6/12002* (2013.01); *G02B 6/12004* (2013.01); *G02B 6/124* (2013.01);
(Continued)

(58) Field of Classification Search
CPC ............ G02B 6/12002; G02B 6/12004; G02B 6/4291; G02B 6/34; G02B 6/125; G02B 6/1228; G02B 6/124; G02B 6/4274
See application file for complete search history.

(56) References Cited

U.S. PATENT DOCUMENTS 6,934,444 B2   8/2005   Ghiron et al.
6,944,369 B2   9/2005   Deliwala
(Continued)

FOREIGN PATENT DOCUMENTS

EP   2010057 A1       1/2009
WO   2014/047443 A1   3/2014
WO   2016004084 A1    1/2016

OTHER PUBLICATIONS

Eric Beyne; The Sum of Minds, IMEC Technology Forum Taiwan, 2013    <http://www2.imec.be/content/user/File/ITF2013 %20Taiwan/Eric%20Beyne.pdf>.
(Continued)

*Primary Examiner* — Ryan Lepisto
(74) *Attorney, Agent, or Firm* — Patterson + Sheridan, LLP

(57) ABSTRACT

The embodiments herein describe a photonic chip (formed from a SOI structure) which includes an optical interface for coupling the optical components in the photonic chip to an external optical device. In one embodiment, the optical interface is formed on a separate substrate which is later joined to the photonic chip. Through oxide vias (TOVs) and through silicon vias (TSVs) can be used to electrically couple the optical components in the photonic chip to external integrated circuits or amplifiers. In one embodiment, after the separate wafer is bonded to the photonic chip, a TOV is formed in the photonic chip to electrically connect metal routing layers coupled to the optical components in the photonic chip to a TSV in the separate wafer. For example, the TOV may extend across a wafer bonding interface where the two substrates where bonded to form an electrical connection with the TSV.

10 Claims, 16 Drawing Sheets

(51) Int. Cl.
G02B 6/122 (2006.01)
G02B 6/124 (2006.01)
G02B 6/42 (2006.01)
G02B 6/125 (2006.01)

(52) U.S. Cl.
CPC .......... *G02B 6/125* (2013.01); *G02B 6/1228* (2013.01); *G02B 6/34* (2013.01); *G02B 6/4274* (2013.01); *G02B 6/4291* (2013.01)

(56) References Cited

U.S. PATENT DOCUMENTS

| | | |
|---|---|---|
| 7,415,184 B2 | 8/2008 | Ghiron et al. |
| 8,121,450 B2 | 2/2012 | Ghiron et al. |
| 8,208,768 B2 | 6/2012 | Su et al. |
| 9,002,156 B2 | 4/2015 | Ellis-Monaghan et al. |
| 9,164,235 B1 | 10/2015 | Tummidi et al. |
| 2012/0224820 A1 | 9/2012 | Onishi |
| 2013/0015546 A1* | 1/2013 | Joe .................. G02B 6/122 257/432 |
| 2013/0279845 A1 | 10/2013 | Kobrinsky et al. |
| 2013/0322811 A1 | 12/2013 | Meade |
| 2014/0174149 A1 | 6/2014 | Wicks et al. |
| 2015/0247974 A1 | 9/2015 | Painchaud et al. |

OTHER PUBLICATIONS

Francoise von Trapp; ALLVIA: Silicon Interposers for Electro-Optical Engines, 2013, 3DInCites <http://www.3dincites.com/2013/06/allvia-silicon-interposers-for-electro-optical-engines/>.

Huang et al.; Modeling of evanescent coupling between two parallel optical nanowires 2007, Applied Optics vol. 46, Issue 9, pp. 1429-1434 http://proxy.osapublishing.org/ao/abstract.cfm?uri=ao-46-9-1429.

Vemooy et al.; Alignment-Insensitive Coupling for PLC based Surface Mount Photonics, 2004, IEE Technology Letters, col. 16, No. 1, Jan. 2004, p. 269-271 <http://authors.library.caltech.edu/7179/1/VERieeeptl04.pdf>.

Urino et al.; High-density and wide-bandwidth optical interconnects with silicon optical interposers [Invited] ,vol. 2, No. 3, Jun. 2014 https://www.osapublishing.org/prj/abstract.cfm?uri=prj-2-3-a1.

Watanabe et al.; Silica-based Optical Interposer for Si Photonics, CLEO Europe, Jun. 2009 (Abstract Only) http://ieeexplore.ieee.org/stamp/stamp.jsp?tp=&arnumber=5191537.

Chen et al.; SOI-enabled three-dimensional integrated-circuit technology, SOI Conference, IEE International, Oct. 2010 (Abstract Only) http://ieeexplore.ieee.org/xpl/articleDetails.jsp?arnumber=5641367.

Burns et al.; A Wafer-Scale 3-D circuit integration technology, CLEO, vol. 53 Jun. 2013 (Abstract Only) http://ieeexplore.ieee.org/xpl/articleDetails.jsp?&arnumber=6833496.

Timurdogan et al.; An Ultra Low Power 3D Integrated Intra-Chip Silicon Electronic-Photonic Link, 2015 http://www.rle.mit.edu/pmg/wp-content/uploads/2015/04/OFC2015Timurdogan.pdf.

Nakamura et al.; High-density silicon optical interposer for inter-chip interconnects based on compact and high speed components, CLEO, 2013 (Abstract Only).

Xu et al., "Physical Modeling of the Capacitance and Capacitive Coupling Noise of Through-Oxide VIAS in FDSOI-Based Ultra-High Density 3-D ICS," IEEE Transactions on Electron Devices, vol. 60, No. 1. Jan. 2013, 9 pages.

Bauters et al., "Silicon on Ultra-Low-Loss Waveguide Photonic Integration Platform," Optics Express, vol. 21, No. 1, Jan. 14, 2013, 12 Pages.

Hatori et al. A Novel Spot Size Convertor for Hybrid Integrated Ligh Sources on Photonics-Electronics Convergence System, IEEE Conference Aug. 29-31, 2012, Date Added to IEEE Explore Oct. 8, 2012. [Abstract Only] [Accessed Online Jun. 26, 2017] Available Online http://ieeexplore.ieee.org/document/6324123/.

Ridder et al., "Silicon Oxynitride Planar Waveguiding Structures for Application in Optical Communication," IEEE Journal of Selected Topics In Quantrum Electronics, vol. 4, No. 6, Nov./Dec. 1998, 9 pages.

Sun et al, "Impedance Matching Vertical Optical Waveguide Couplers for Dense High Index Contrast Circuits," 2008, Optical Society of America, vol. 16, Issue 16, pp. 11685-11690.

Worhoff et al, "Design,Tolerance Analysis, and Fabrication of Silicon Oxynitride Based Planar Optical Waveguides for Communication Devices," Journal of Lightwave Techology, vol. 17, No. 8, Aug. 1999, 8 pages.

Choudhury et al. "Method of Improving Light Coupling Efficiency Between Optical Fibers and Silicon Waveguides", IEEE Photonics Technology Letters, vol. 17, No. 9, Sep. 2005, 4 pages.

Barkai et al, "Efficient Mode Conveter for Coupling between Fiber and Micrometer Size Silicon Waveguides," IEEE Xplore, Oct. 15, 2007, 4 pages.

Hirohito Yamada, "Analysis of Optical Coupling for SOI Waveguides," Piers Online, vol. 6, No. 2, 2010, 4 pages.

Frumkin et al., "Silicon Nanophotonic Multitaper for Efficient Light Coupling Between Fiber and Silicon Waveguide," Journal of Nanophotonics, Accepted Aug. 7, 2013 [Abstract Only] [Available Online] http://nanophotonics.spiedigitallibrary.org/article.aspx?articleid=1734063.

Peng Sun and Ronald Reano, "Fiber Coupling to Silicon Waveguides Using Cantilever Couplers," IEEE Conference, Oct. 4-8, 2009. [Abstract Only] [Available Online] http://ieeexplore.ieee.org/document/5343458/.

Almeida et al., "Nanotaper for compact mode conversion," Optics Letters, vol. 28, No. 15, Aug. 1, 2003, 3 pages.

J.K. Doylend and A.P. Knights, "Design and Simulation of an Integratede Fiber-to-Chip Coupler for Silicon-on-Insulator Naveguides", IEEE Journal of Selected Topics in Quantum Electronics, vol. 12, No. 6, Nov./Dec. 2006. 9 pages.

Vermeulen et al., "High-efficiency fiber-to-chip grating couplers realized using an advanced CMOS-compatible Silicon-On-Insulator platform," Opical Society of America, Revised Aug. 1, 2010; accepted Aug. 3, 2010, published Aug. 10, 2010. 6 pages.

Alder et. al, "High-efficiency fiber-to-chip coupling using low-loss tapered single-mode fiber," IEEE Photonics Techology Letters, vol. 12, Issue 8, Aug. 2000. [Abstract Only] [Available Online] http://ieeexploreieee.org/document/867993/.

Halir et al., "Continuously apodized fiber-to-chip surface grating coupler with refractive index enginnered subwavelength structure," Optics Letters, vol. 25, Issue 19, pp. 3243-3245. [Abstract Only] [Accessed Online] https://www.osapublishing.org/ol/abstract.cfm?uri=ol-35-19-3243.

Hauffe et al., "Methods for passive fiber chip coupling of integrated optical devices," IEEE Transactions on Advanced Packaging, vol. 24 ,Issue 4, Nov. 2001, pp. 450-455 [Abstract Only] [Available Online] http://ieeexplore.ieee.org/document/982828/.

Khilo et al., "Efficient planar fiber-to-chip coupler based on two-stage adiabatic evolution," Optics Express, vol. 18, No. 15, received Apr. 21, 2010; revised Jun. 28, 2010; accepted Jul. 1, 2010, published Jul. 12, 2010.

Sun et al., "High Performance Asymmetric Graded Index Coupler With Integrated Lens for High Index Wavesguides," Applied Physics Letters, vol. 90, Issue 20, Published online May 2007, accepted Apr. 2007. [Abstract Only] [Available Online] http://aip.scitation.org/doi/10.1063/1.2740589.

\* cited by examiner

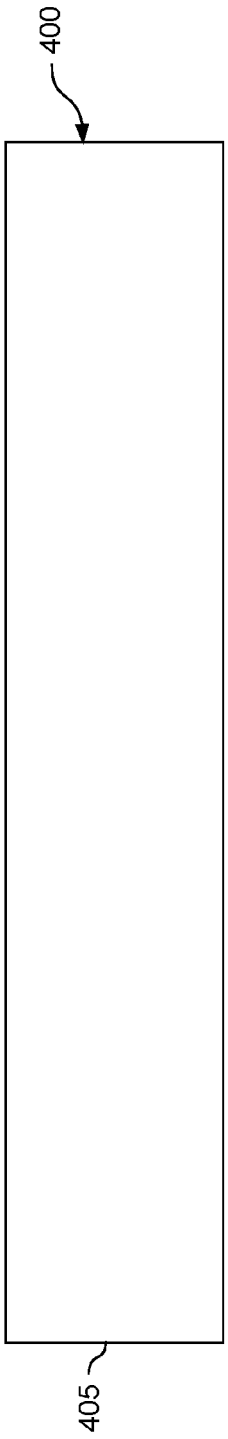
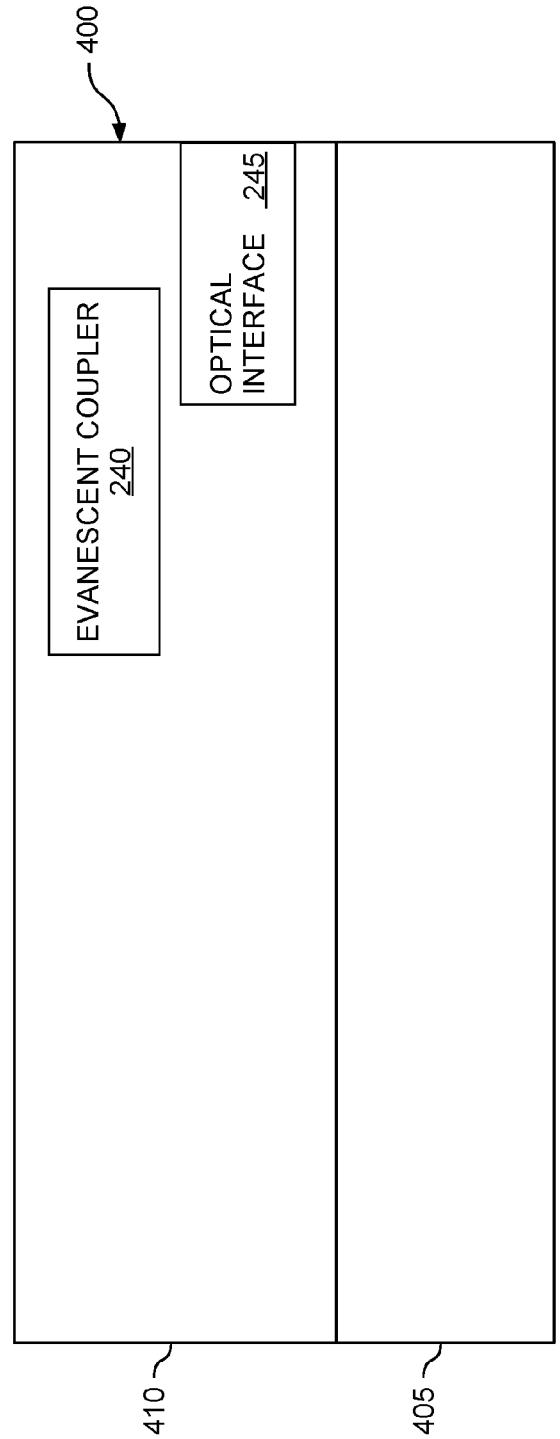

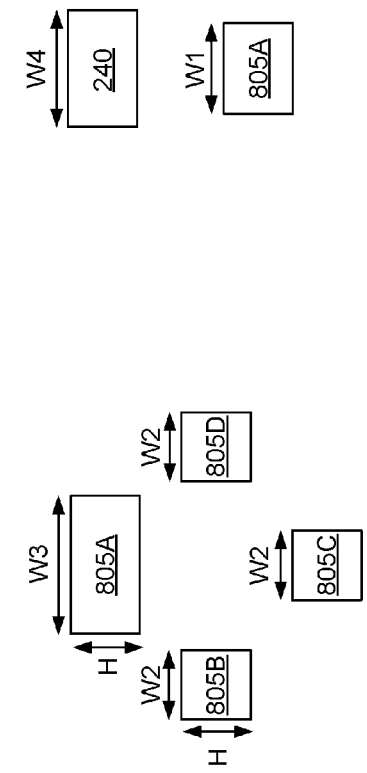
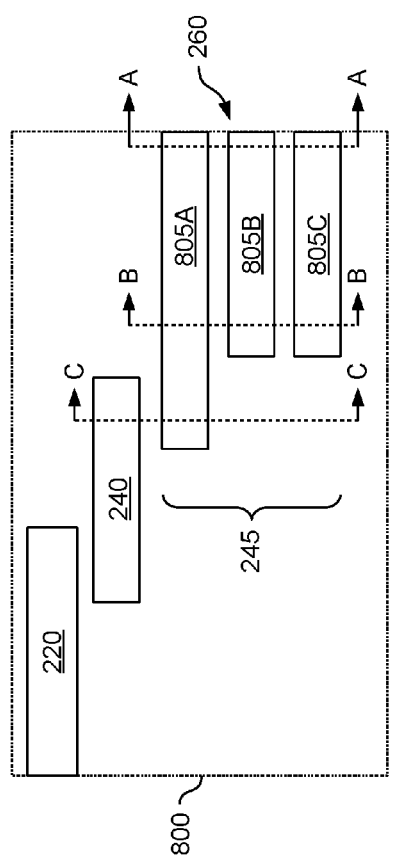
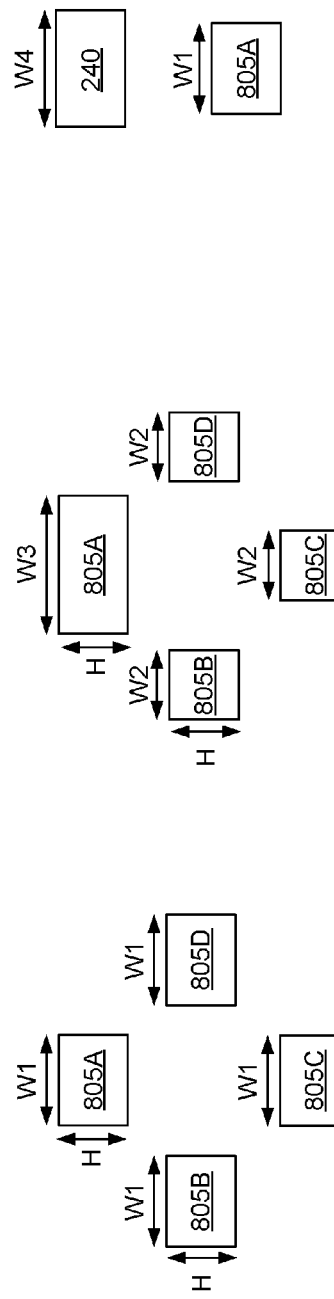

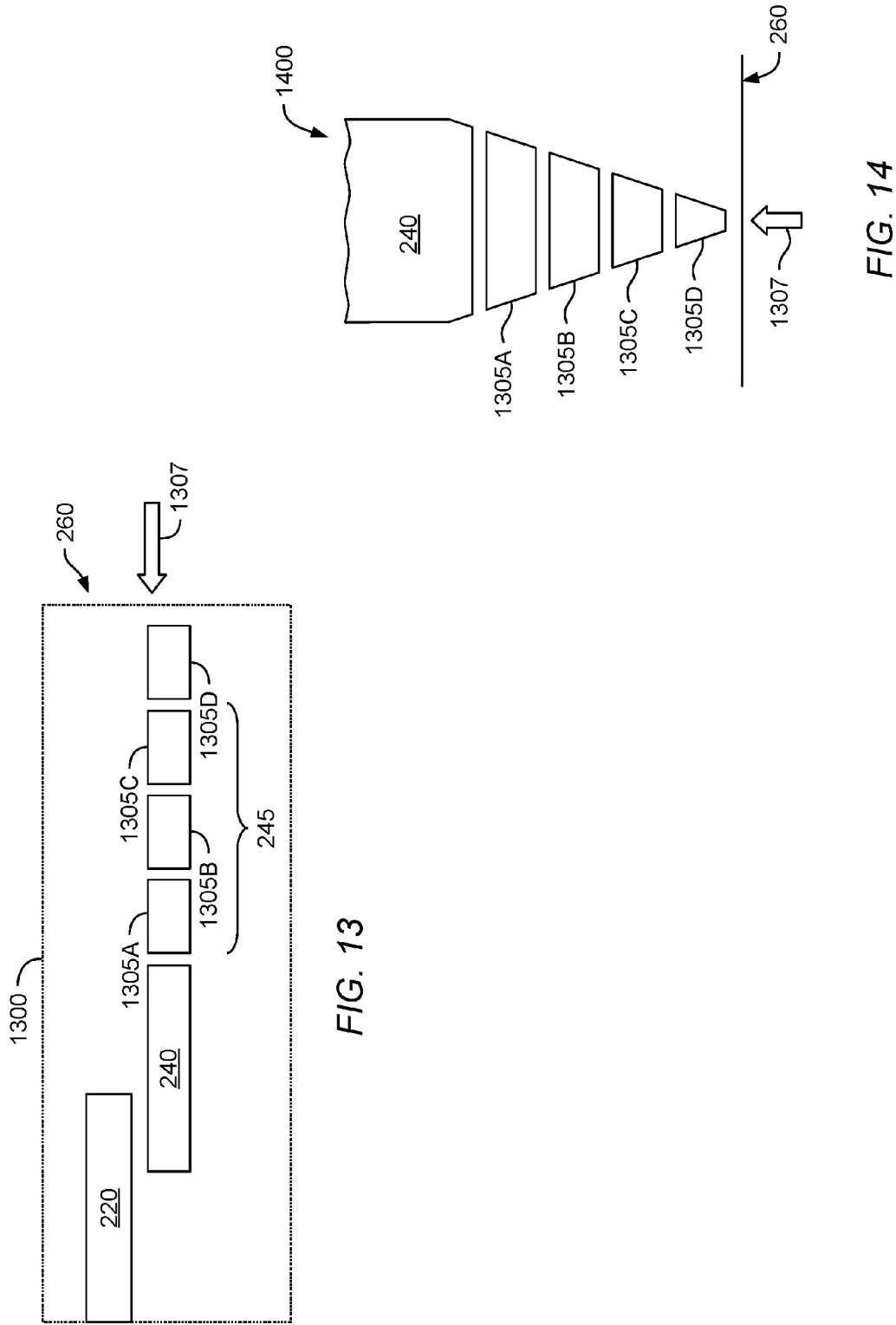

SILICON PHOTONIC CHIP WITH THROUGH VIAS

CROSS-REFERENCE TO RELATED APPLICATIONS

This application is a non-provisional application of U.S. provisional application Ser. No. 62/254,929, filed Nov. 13, 2015 and provisional application Ser. No. 62/298,228 filed on Feb. 22, 2016. The aforementioned related patent applications are herein incorporated by reference in their entirety.

TECHNICAL FIELD

Embodiments presented in this disclosure generally relate to waveguides in a silicon-on-insulator (SOI) device, and more specifically, to coupling optical components to through silicon or through oxide vias.

BACKGROUND

SOI optical devices may include an active surface layer that includes waveguides, optical modulators, detectors, complementary metal-oxide-semiconductor (CMOS) circuitry, metal leads for interfacing with external semiconductor chips, and the like. Transmitting optical signals from and to this active surface layer introduces many challenges. In some optical devices, lenses are used to focus the light from an external fiber optic cable or a laser source into the waveguides, thereby shrinking the mode or adjusting the numerical aperture such that the optical signal can be efficiently transferred into the sub-micron waveguides.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4A and 4B illustrate forming a wafer with an optical interface, according to one embodiment disclosed herein.

FIG. 8 illustrates an optical interface, according to one embodiment disclosed herein.

FIGS. 9A-9C illustrate cross sections of the optical interface in FIG. 8, according to one embodiment disclosed herein.

FIG. 13 illustrates an optical interface, according to one embodiment disclosed herein.

FIG. 14 illustrates a top view of the optical interface in FIG. 13, according to one embodiment disclosed herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
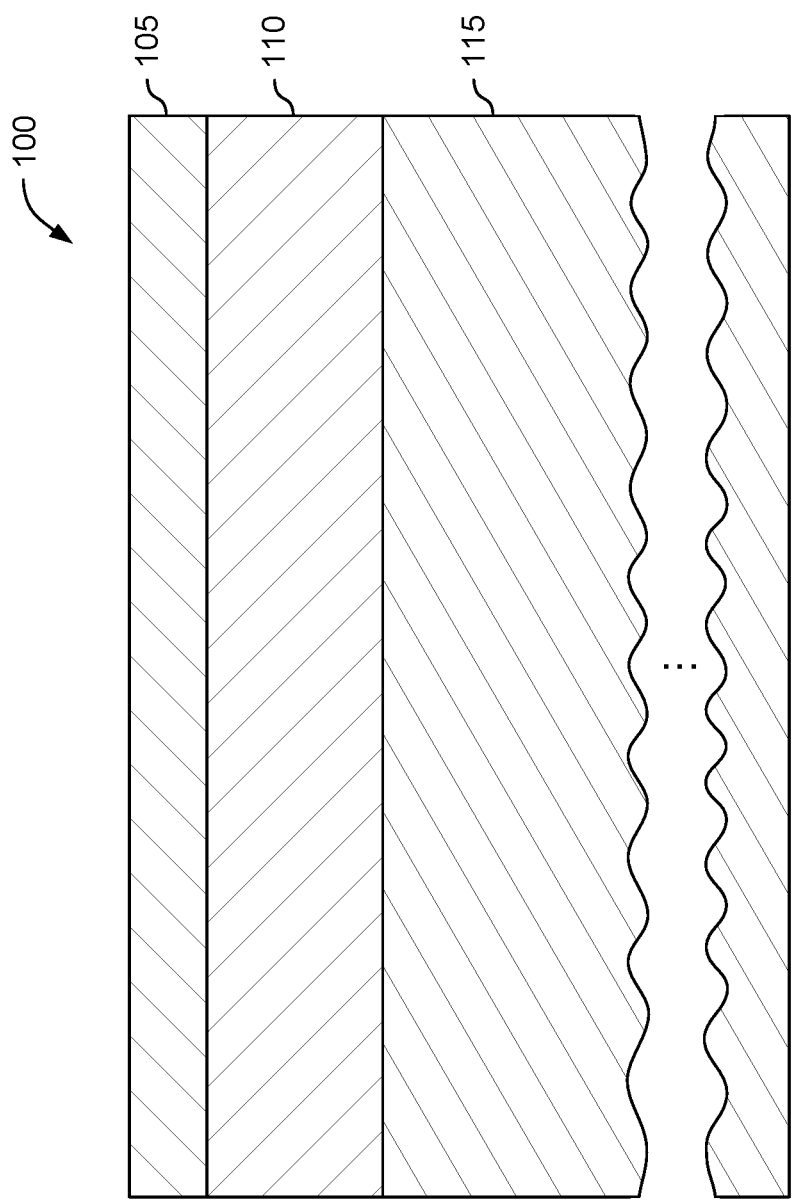
FIG. 1 illustrates an SOI device, according to one embodiment disclosed herein.

One embodiment presented in this disclosure is a photonic chip that includes a first substrate that includes a crystalline semiconductor substrate and a through silicon via (TSV) extending through the semiconductor substrate. The photonic chip includes a second substrate bonded to the first substrate at a wafer bonding interface. The second substrate includes an active surface layer comprising an optical component optically coupled to a semiconductor waveguide. The photonic chip also includes a through oxide via (TOV) formed in both the first and second substrates where the TOV crosses the wafer bonding interface and is electrically coupled to the TSV, an evanescent coupler spaced apart from the semiconductor waveguide along a direction normal to the active surface layer, wherein the evanescent coupler is optically coupled to the semiconductor waveguide, and an optical interface optically coupled to the evanescent coupler, wherein the optical interface permits optical signals to be transferred between the photonic chip and an external optical device via a coupling surface.

Another embodiment described herein is a method of forming a photonic chip. The method includes bonding a first substrate to a second substrate at a wafer bonding interface where the second substrate comprises an active surface layer comprising an optical component optically coupled to a semiconductor waveguide and forming, after bonding the first and second substrates, a TOV in both the first and second substrates where the TOV crosses the wafer bonding interface and is electrically coupled to a TSV that extends through a crystalline semiconductor substrate in the first substrate. The photonic chip comprises an evanescent coupler spaced apart from the semiconductor waveguide along a direction normal to the active surface layer where the evanescent coupler is optically coupled to the semiconductor waveguide. The photonic chip comprises an optical interface optically coupled to the evanescent coupler where the optical interface permits optical signals to be transferred between the photonic chip and an external optical device via a coupling surface.

EXAMPLE EMBODIMENTS

Transmitting optical signals from or to the active surface layer in SOI optical devices introduces many challenges. For example, a fiber optic cable may be attached to the SOI optical device and interface with a waveguide in the SOI device's surface layer; however, the diameter of the one or more modes of the optic cable (e.g., approximately 10 microns for a single-mode cable) may have a much different size than the mode of a sub-micron dimensioned waveguide tasked with routing the optical signal in the SOI device. Accordingly, directly interfacing the fiber optic cable with the sub-micron waveguide may result in low transmission efficiency or high coupling loss.

The embodiments herein describe a photonic chip (formed from a SOI structure) which includes an optical interface for optically coupling the optical components in the photonic chip (e.g., optical modulator, optical detectors, semiconductor waveguides, etc.) to an external optical device. In one embodiment, the optical interface is formed on a separate substrate which is later joined to the photonic chip. One advantage of doing so is that the waveguides in the optical interface can be formed using higher anneal temperatures thereby reducing their optical loss.

Regardless of whether the optical interface is formed on the separate substrate or on the same substrate that includes the optical components, through oxide vias (TOVs) and through silicon vias (TSVs) can be used to electrically couple the optical components in the photonic chip to external integrated circuits or amplifiers. In one embodiment, after the separate wafer is bonded to the photonic chip, a TOV is formed in the photonic chip to electrically connect metal routing layers coupled to the optical components to a TSV in the separate wafer. For example, the TOV may extend across a wafer bonding interface where the separate wafer was bonded to the photonic chip. Furthermore, the TOV and TSV are coupled to a common metal layer in the separate substrate which permits electrical signals transmitted onto an end of the TSV to control the optical components coupled to an end of the TOV.

FIG. 1 illustrates an SOI device 100, according to one embodiment disclosed herein. As shown, SOI device 100 includes a surface layer 105, a buried insulation layer 110 (also referred to as buried oxide (BOX) layer), and a semiconductor substrate 115. Although the embodiments herein refer to the surface layer 105 and substrate 115 as crystalline silicon, the disclosure is not limited to such. For example, other semiconductors or optically transmissive materials may be used to form the SOI device 100 shown here. Moreover, the surface 105 and the substrate 115 may be made of the same material, but in other embodiments, these layers 105, 115 may be made from different materials.

The thickness of the surface layer 105 may range from less than 100 nanometers to greater than a micron. More specifically, the surface layer 105 may be between 100-300 nanometers thick. The thickness of the insulation layer 110 may vary depending on the desired application. Generally, the thickness of insulation layer 110 may range from less than one micron to tens of microns. The thickness of the substrate 115 may vary widely depending on the specific application of the SOI device 100. For example, the substrate 115 may be the thickness of a typical semiconductor wafer (e.g., 100-700 microns) or may be thinned and mounted on another substrate in some embodiments described herein.

For optical applications, the surface layer 105 of the SOI device 100 may be etched to form one or more silicon waveguides. Because silicon has a higher refractive index compared to an insulator such as silicon dioxide or silicon oxynitride, the optical signal remains primarily in the waveguide as it propagates through the surface layer 105.

Figure 2:
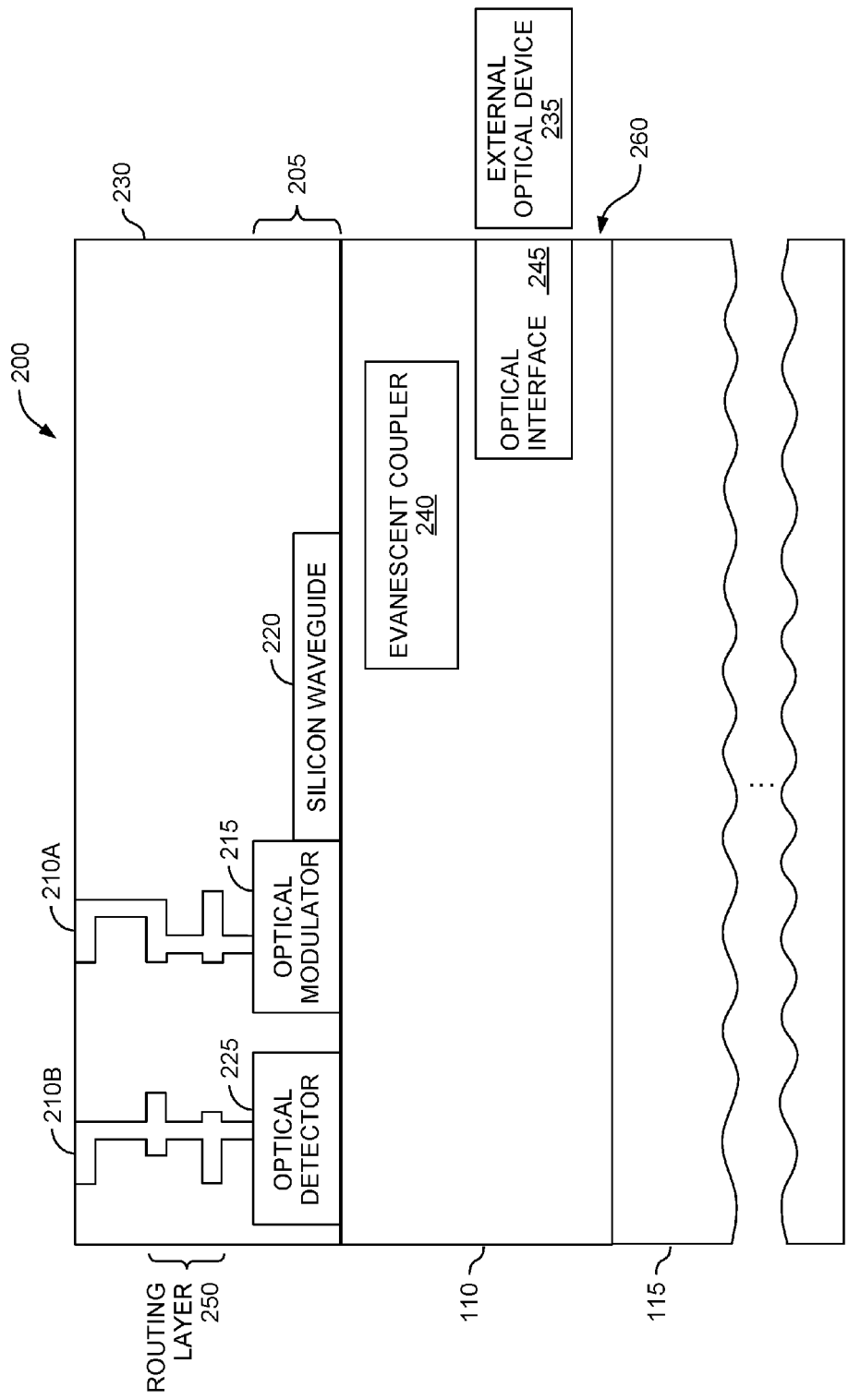
FIG. 2 illustrates an SOI device with an optical interface, according to one embodiment disclosed herein.

FIG. 2 illustrates an SOI device 200 (also referred to as a photonic chip) optically coupled to an external optical device 235 to form an optical system, according to one embodiment disclosed herein. Like the SOI device 100 in FIG. 1, SOI device 200 includes a silicon layer 205, insulation layer 110, and substrate 115. However, the silicon layer 205 (also referred to as the active surface layer or active region) has been processed to include various optical components that may be used in an optical device 200. For example, silicon surface layer 205 includes an optical modulator 215 which is electrically coupled to a conductive lead 210A via metal routing layers 250. The conductive lead 210A is exposed on a top surface of the SOI device 200. The modulator 215 may have been formed by performing various fabrication steps on the silicon layer 205 such as etching or doping the crystalline silicon as well as depositing additional materials onto the layer 205 (e.g., amorphous silicon or polysilicon). The conductive lead 210A can carry data signals that control the optical modulator 215. For example, the optical modulator 215 may be a CMOS capacitor including n-type and p-type doped regions coupled to respective metal leads for changing the phase of an optical signal passing through the modulator 215. Although not shown, the metal leads 210 may be connected to an integrated circuit or transimpedance amplifier mounted onto the SOI device 200 via a ball grid array or copper pillar flip chip attach process that provides the data signals which control the modulator 215. In another embodiment, the integrated circuit may be physically separate from the SOI device 200 but coupled to the metal leads 210 through bond wires.

Like optical modulator 215, a silicon waveguide 220 may have been fabricated from the silicon surface layer 105 shown in FIG. 1. In one embodiment, the silicon waveguide 220 is a sub-micron waveguide where the width and height (i.e., thickness) of the waveguide are less than 1 micron. The SOI device 200 uses the waveguide 220 to carry an optical signal to different areas of the layer 205. For example, the optical modulator 215 may modulate a received optical signal which is then outputted and propagated along waveguide 220.

In addition to including components made from silicon, the SOI device 200 includes optical detector 225 which may be made from other materials (e.g., optical detector 225 may be a geranium detector) or a combination of silicon with other materials. These other materials may be deposited on active layer 205 using any suitable deposition technique.

Once the active layer 205 is processed to include the desired components, the components are covered with a protective, insulative material 230 (e.g., an electrical insulative material) which may serve as a suitable base for mounting additional circuitry on the SOI device 200. In this manner, the active surface layer 205 of SOI device 200 may be processed using any number of techniques to form a device for performing a particular application such as optical modulation, detection, amplification, generating an optical signal, and the like.

The right side of the device 200 forms a coupling surface 260 through which optical signals are transferred between an optical interface 245 and the external optical device 235. Moreover, the optical interface 245 is coupled to an evanescent coupler 240 which is in turn optically coupled to the silicon waveguide 220. As such, optical signals can be transferred between the silicon waveguide 220 and the external optical device 235. In one embodiment, the external optical device 235 includes a light source (e.g., a laser or optical fiber) for transmitting an optical signal into the silicon waveguide 220. Alternatively, the external optical device 235 includes a waveguide (e.g., optical fiber) for receiving light from the silicon waveguide 220. In one embodiment, the silicon waveguide 220, evanescent coupler 240, optical interface 245, and external optical device 235 transfer an optical signal adiabatically.

Figure 3:
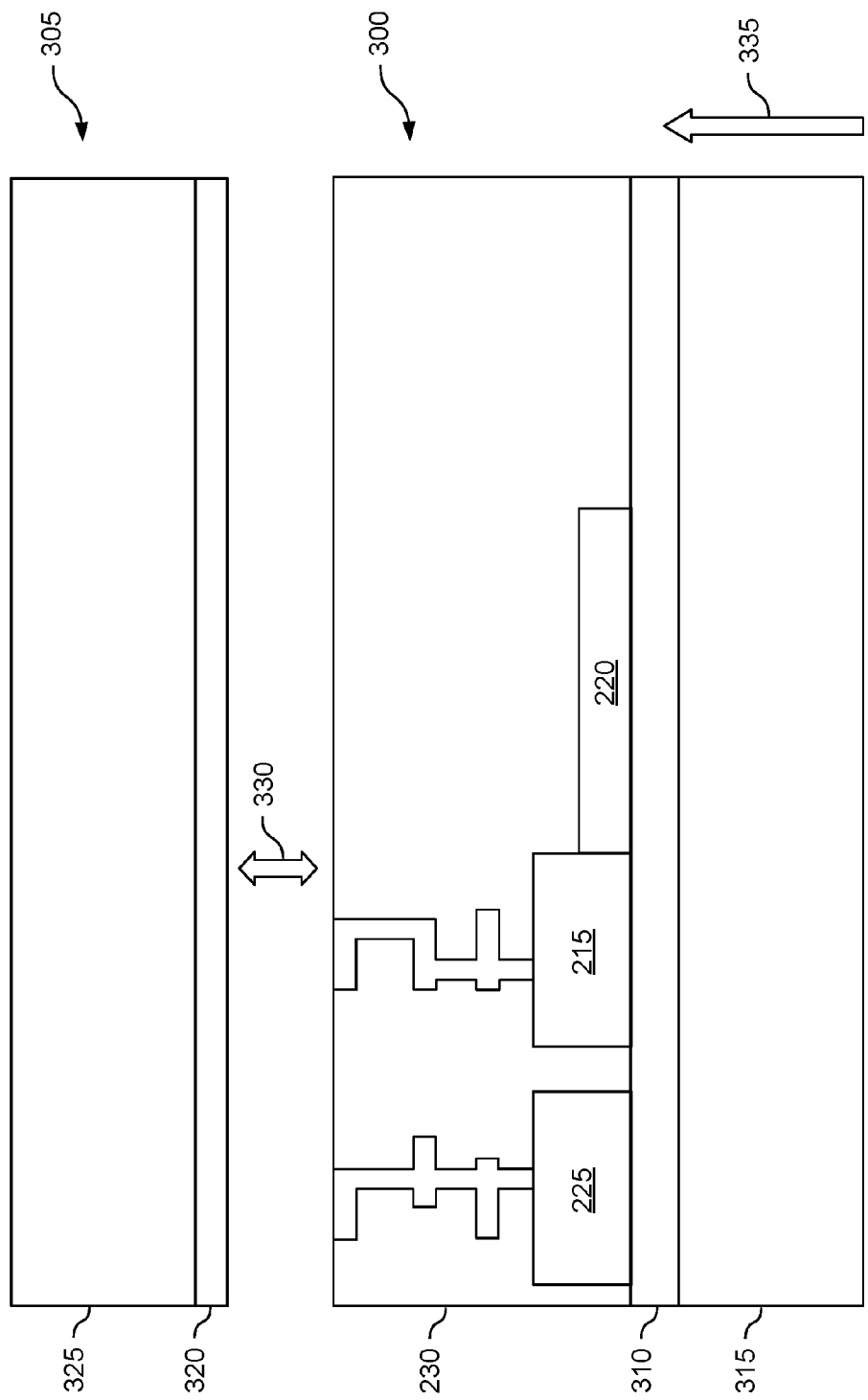
FIG. 3 illustrates joining two wafers to optically couple waveguides, according to one embodiment disclosed herein.

FIG. 3 illustrates joining two wafers to optically couple waveguides, according to one embodiment disclosed herein. FIG. 3 illustrates a first wafer 300 and a second wafer 305 which are bonded together as shown by arrow 330. The first wafer 300 is similar to SOI device 200 except that the first wafer 300 does not include the evanescent coupler 240 and optical interface 245 which are disposed between the silicon waveguide 220 and the substrate 115. Instead, the wafer 300 includes a thin buried insulation layer 310 disposed on a semiconductor substrate 315.

In order to add the evanescent coupler 240 and the optical interface 245 to the wafer 300, in this embodiment, the top surface of the wafer 300 is bonded to an insulation layer 320 of wafer 305. In this example, the material of the insulation layer 320 is the same as the insulative material 230. For example, the bond between the wafers 300 and 305 can be an oxide-oxide wafer bond. Once bonded, the insulation layer 320 becomes part of the insulation material 230.

Arrow 335 illustrates removing the semiconductor substrate 315 (and a portion of the insulation layer 310) after wafer 300 has been bonded to wafer 305. The substrate 315 may be removed using chemical mechanical polishing (CMP) while the substrate 325 provides support for the combined wafer structure. That is, bonding wafer 300 to wafer 305 enables the substrate 325 to be used to support the components in the photonic chip while substrate 315 is removed.

FIGS. 4A and 4B illustrate forming a wafer 400 with an optical interface 245, according to one embodiment disclosed herein. In FIGS. 4A and 4B, a semiconductor substrate 405 is processed to add the evanescent coupler 240 and the optical interface 245. As mentioned above, the evanescent coupler 240 and optical interface 245 are evanescently coupled such that optical signals can be transmitted between the coupler 240 and an external optical device via the optical interface 245. In one embodiment, the evanescent coupler 240 and the optical interface 245 are disposed in an insulative material 410 which is selected so that the coupler 240 and optical interface 245 function as waveguides. The specific shape and design of the evanescent coupler 240 and optical interface 245 is discussed below in FIGS. 8-14.

Figure 5:
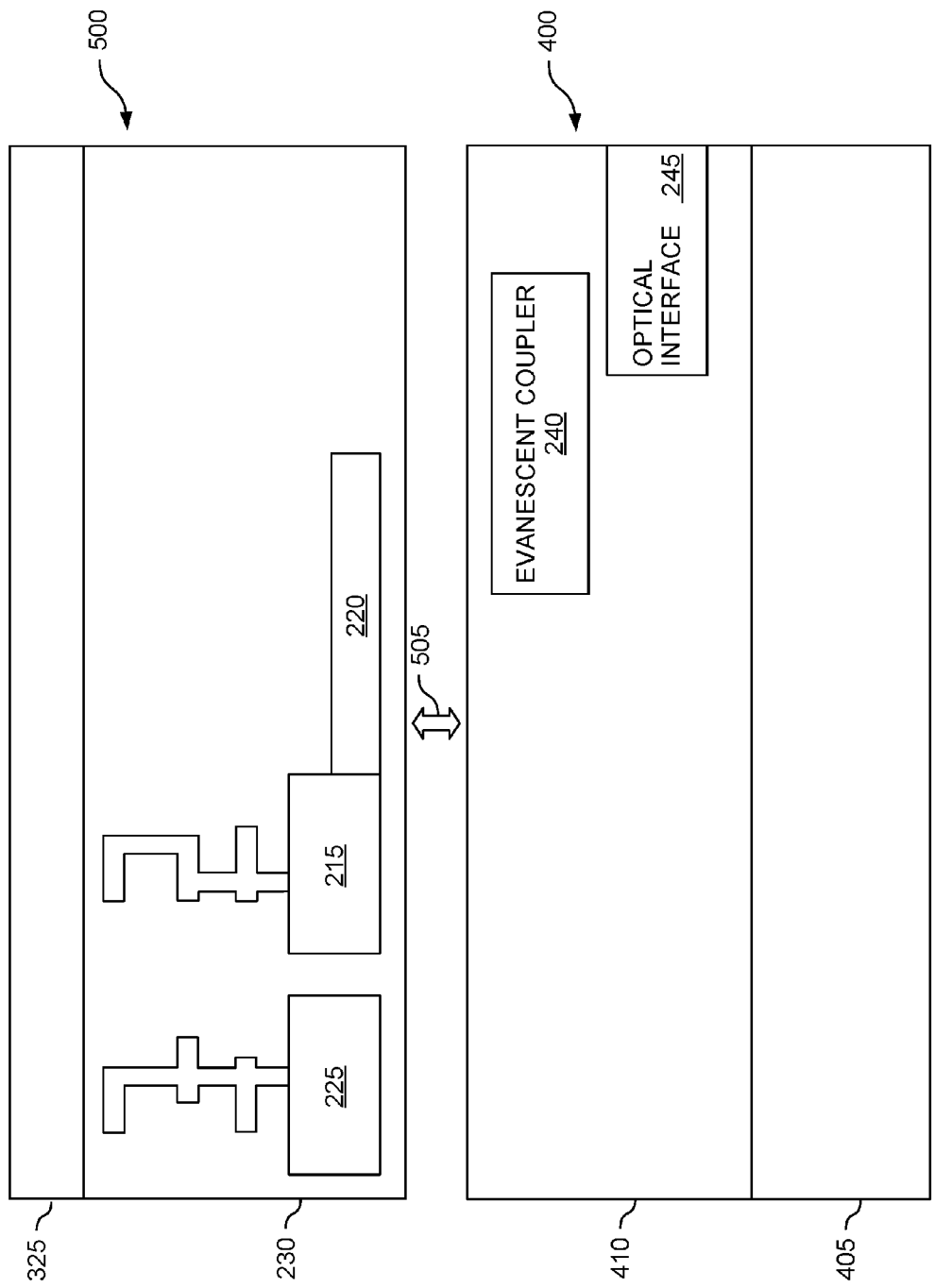
FIG. 5 illustrates coupling the wafer with the optical interface to a photonic chip, according to one embodiment disclosed herein.

FIG. 5 illustrates coupling the wafer 400 with the optical interface 245 in FIG. 4B to a photonic chip 500, according to one embodiment disclosed herein. In FIG. 5, the photonic chip 500 is formed from the process steps illustrated in FIG. 3 where the wafer 300 is bonded to wafer 305 and then the substrate 315 is removed. As such, the photonic chip 500 includes a thick (e.g., greater than 100 microns) substrate 325 which provides support while the photonic chip 500 is bonded to the wafer 400 as shown by arrow 505. For example, the material of the insulative material 230 may be the same material as the insulative material 410. In one embodiment, opposing surfaces of the material 230 and 410 are bonded using an oxide-oxide bond to form a single wafer or substrate.

When bonding the wafer 400 to the photonic chip 500, the wafer 400 is aligned to the photonic chip 500 such that at least a portion of the evanescent coupler 240 overlaps the silicon waveguide 220. Furthermore, the separation distance between the waveguide 220 and evanescent coupler 240 is small enough (e.g., less than two microns) so that the two optical components are evanescently coupled. Stated differently, the amount of insulative material 230 and 410 between the waveguide 220 and evanescent coupler 240 is controlled to enable evanescent coupling.

Figure 6:
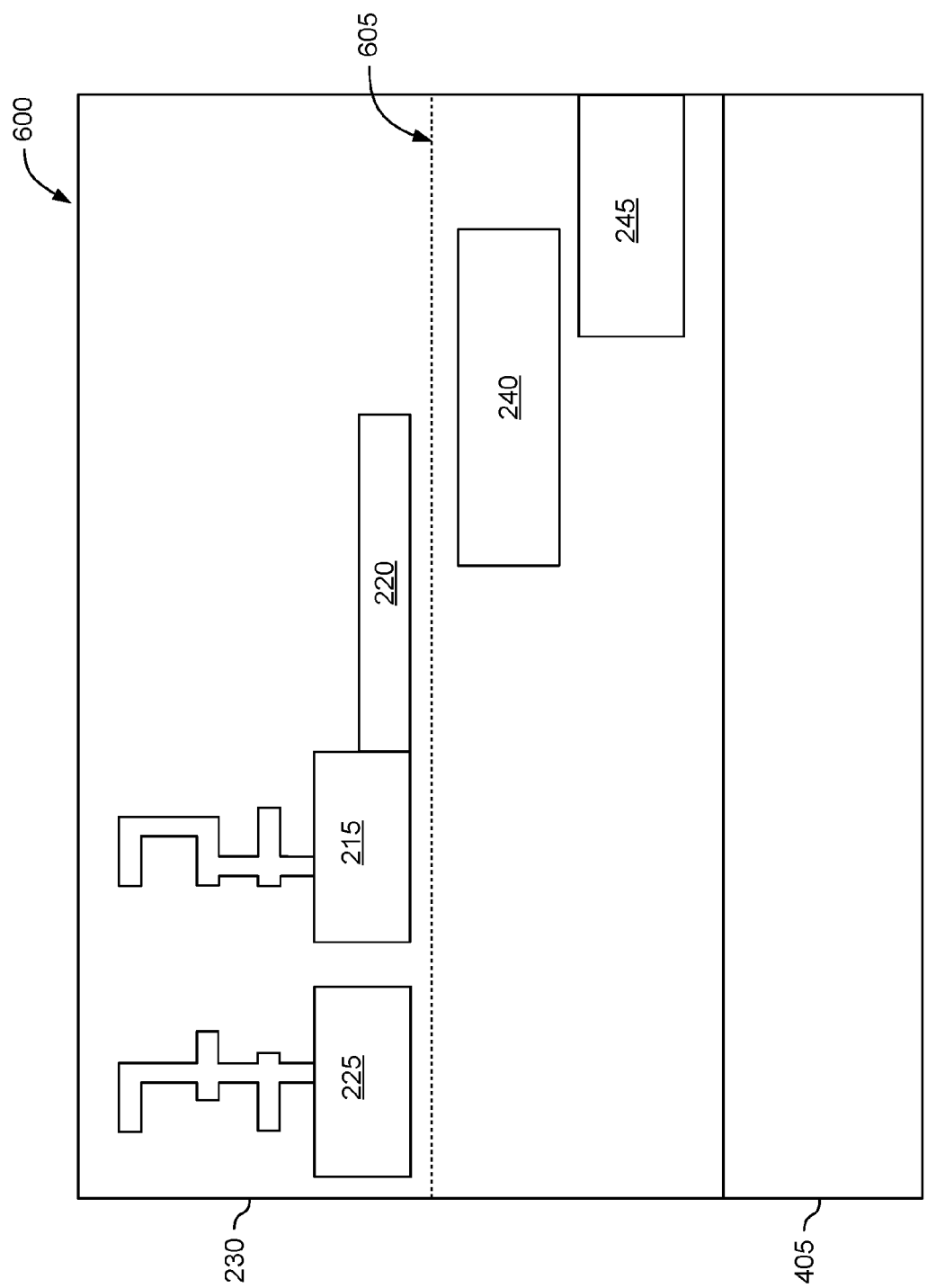
FIG. 6 illustrates a photonic chip with a buried optical interface, according to one embodiment disclosed herein.

FIG. 6 illustrates a photonic chip 600 with a buried optical interface 245, according to one embodiment disclosed herein. Specifically, FIG. 6 illustrates the result of bonding the photonic chip 500 and wafer 400 as shown in FIG. 5. The location of the bond between photonic chip 500 and wafer 400 is shown by a wafer bonding interface 605 (i.e., the dotted line). Once combined, the photonic chip 600 includes the optical coupler 240 and optical interface 245 which are between the silicon waveguide 220 and the substrate 405. Furthermore, because the substrate 405 can now support the components in the photonic chip 600, the substrate 325 in the photonic chip 500 can be removed using, e.g., CMP.

In sum, FIGS. 3-6 illustrate a method or process where the evanescent coupler 240 and optical interface 245 can be added to a photonic chip after the various components in the chip (e.g., optical detector, optical modulator, submicron waveguides, etc.) have been formed in an active layer. One advantage of forming the evanescent coupler 240 and the optical interface 245 on a separate wafer (e.g., wafer 400) is that higher deposition and annealing temperatures can be used to form the waveguides in these components. For example, if silicon nitride (SiN) or silicon oxynitride (SiON) waveguides are used, higher deposition and annealing temperatures can be used to generate low optical loss waveguides in the evanescent coupler 240 and optical interface 245. If the waveguides in the evanescent coupler 240 and the optical interface 245 are formed on a photonic chip that already includes optical components such as the optical detector 225 or the modulator 215, these components can be harmed by high anneal temperatures. Thus, forming the evanescent coupler 240 and optical interface 245 separately may result in lower loss waveguides than would otherwise be possible. In one embodiment, the waveguides in the evanescent coupler 240 and optical interface 245 are formed using plasma-enhanced chemical vapor deposition (PECVD) or low pressure chemical vapor deposition (LPCVD) and sidewall smoothing.

Figure 7:
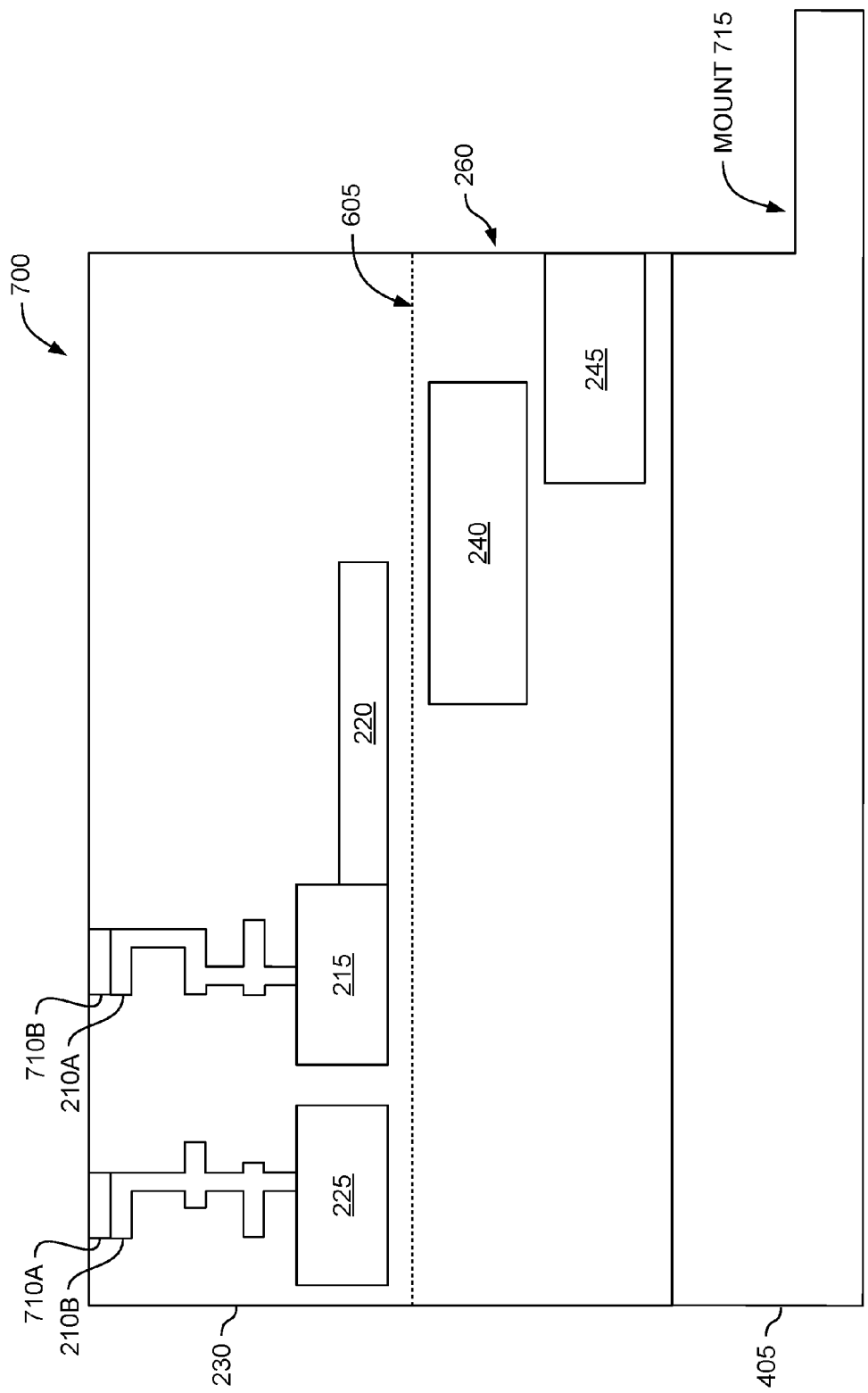
FIG. 7 illustrates preparing the photonic chip to couple to an external integrated circuit, according to one embodiment disclosed herein.

FIG. 7 illustrates preparing the photonic chip 700 to couple to an external integrated circuit, according to one embodiment disclosed herein. As shown, insulative material 230 covering the conductive leads 210A and 210B is removed. Using a deposition technique, metal bond pads 710 are deposited on the leads 210. In one embodiment, the bond pads 710 are coupled to a ball grid array or copper pillars in a flip chip arrangement where the photonic chip 700 is mounted on an integrated circuit or FPGA, or vice versa. In another embodiment, the bond pads 710 may be wire bonded to an external integrated circuit.

The photonic chip 700 also includes a mount 715 which can provide support for an external optical device (not shown). For example, reactive ion etching (RIE) can be used to etch a portion of the substrate 405 and the optical interface 245 to form the mount 715 on which a laser or optical fiber can be mounted at the coupling surface 260. When disposed on the mount 715, the external optical device is aligned with the optical interface 245 along the coupling surface 260 such that optical signals can be transferred between the silicon waveguide 220 and the external optical device.

FIG. 8 illustrates a side view of an optical interface 245 which can be included in any of the photonic chips described above. Specifically, FIG. 8 illustrates a portion 800 of the photonic chip 700 in FIG. 7. In portion 800, the optical interface 245 forms a prong that includes multiple waveguides 805. The rightmost ends of the waveguides 805 extend to the coupling surface 260. The leftmost end of waveguide 805A overlaps at least a portion of the evanescent coupler 240. In contrast, the ends of waveguides 805B and 805C terminate before these waveguides reach the optical coupler 240. As described below, the waveguides 805 are shaped so that optical signals are transmitted efficiently between an external optical device (not shown) and the silicon waveguide 220.

FIGS. 9A-9C illustrate cross sections of the optical interface 245 in FIG. 8, according to one embodiment disclosed herein. Specifically, FIG. 9A illustrates the cross section A-A of a portion of the optical interface 245 that is closest to the coupling surface 260. Here, the optical interface 245 includes four separate waveguides 805A-D that may have the same or similar width (W1) and height (H) (or thickness) dimensions. These dimensions, as well as the spacing between the waveguides 805A-D may vary depending on the specific application. In the example shown, the optical interface 245 may be configured to interface with a single mode optical fiber with a 10 micron core. As will be appreciated by one of ordinary skill in the art, these dimensions may vary depending on the specific application. Specifically, the dimensions may be chosen such that the mode of the prong at the coupling surface 260 substantially matches the mode of the external optical device to which light is to be coupled to or from. Here, the width of the waveguides 805A-D may range from approximately 200-300 nanometers with a height between 100-200 nanometers. More specifically, the width may be around 250 nanometers while the height is approximately 200 nanometers. The distance between waveguide 805A and waveguide 805C and the distance between waveguide 805D and waveguide 805B may be around four microns. As mentioned above, the dimensions, as well as the spacing, of the waveguides 805 may vary according to the mode or design of the external light source coupled to the photonic chip.

FIG. 9B illustrates the cross section B-B of the optical interface 245. This figure shows that as the optical interface 245 extends away from the coupling surface 260, the width (W2) of the waveguides 805B, 805C, and 805D reduces while the width (W3) of waveguide 805A increases. In one embodiment, the tapering of widths of the waveguides 805B-D is done in an adiabatic fashion. The tapering results in a gradual transition of optical energy from an optical mode which is confined by all the waveguides 805A-D at or near the coupling surface 260 where the widths and heights of all the waveguides 805A-D are same to a mode which is gradually confined more and more in the upper waveguide 805A at positions farther away from the coupling surface 260. This tapering transfers the optical energy confined by waveguides 805A-D to waveguide 805A alone. However, the opposite is also true. That is, tapering the widths also enables a signal introduced in the upper waveguide 805A from the evanescent coupler 240 to be transferred to a mode confined by waveguides 805A-D as the optical signal propagates towards the coupling surface 260. The widths of the waveguides 805A-D may change continuously (e.g., a linear or non-linear fashion such as exponentially or at higher order polynomial profiles) or at discrete increments as the optical interface 245 extends away from the coupling surface 260. As shown in FIG. 8, eventually the waveguides 805B-D terminate while waveguide 805A continues to transmit the optical signal. In one embodiment, the optical interface 245 may extend for approximately 500 microns from the coupling surface 260 before the waveguides 805B-D terminate. Furthermore, the optical interface 245 may taper for all of this length or for only a portion thereof. For example, the widths of the waveguides 805A-D may remain substantially equivalent for the first five to ten microns before the widths of waveguides 805A-D begin to change. Furthermore, although FIG. 8 illustrates the rightmost ends of the waveguides 805 being exposed on the coupling surface 260, in another embodiment the waveguides 805 may be recessed 1-5 microns from the surface 260.

FIG. 9C illustrates the cross section C-C of the optical coupler 240 and the waveguide 805A in the optical interface 245. Here, the width (W1) of waveguide 805A has shrunk while the width (W4) of the coupler 240 has increased. This tapering, which is again shown in an adiabatic fashion, results in the optical signal in waveguide 805A transferring to evanescent coupler 240 and vice versa with minimal loss. Eventually, waveguide 805A terminates and the evanescent coupler 240 continues to transmit the optical signal.

In another embodiment, instead of having a separate evanescent coupler 240, the upper waveguide 805A could optically couple the optical interface 245 to the silicon waveguide 220. The cross section of this optical interface 245 would be the same as shown in FIGS. 9A and 9B. However, instead of the optical signal transferring between the upper waveguide 805A and the optical coupler 240, the upper waveguide 805A would overlap with the silicon waveguide 220. By inversely tapering the widths of the waveguide 805A and the silicon waveguide 220 relative to each other, optical signals can be transferred between the components as described above.

Although the embodiments above discuss tapering the waveguides 805A-D by changing the width, a similar transfer of optical power may occur if the heights are tapered, or some combination of both. However, tapering the height of the waveguides 805A-D may require different lithography and fabrication techniques or materials than tapering the widths as shown here.

Figure 10B:
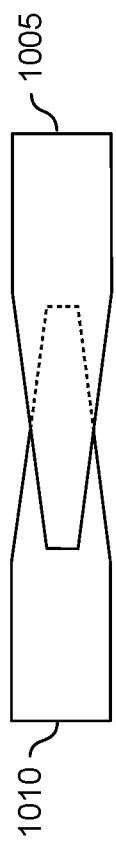
FIGS. 10A-10B illustrate an overlapping waveguide structure for transferring an optical signal between waveguides, according to embodiments disclosed herein.
Figure 10A:
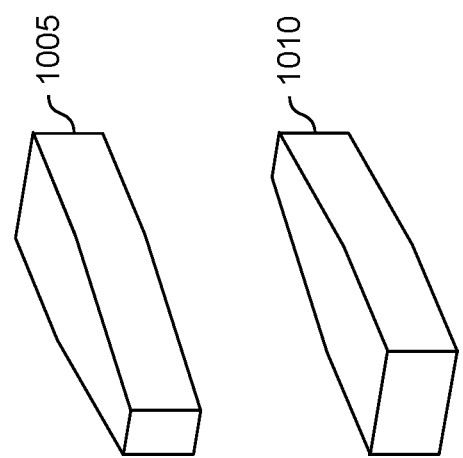

FIGS. 10A-10B illustrate an overlapping waveguide structure for transferring an optical signal between waveguides, according to embodiments disclosed herein. As shown, FIG. 10A illustrates a plan view of a first tapered waveguide 1005 partially overlapping a second tapered waveguide 1010. Specifically, FIG. 10A may be the arrangement in FIG. 8 where the evanescent coupler 240 overlaps the waveguide 805A in the optical interface 245 or where the silicon waveguide 220 overlaps the optical coupler 240. The tapering of the waveguides is done adiabatically to minimize optical loss. In one embodiment, the waveguides 1005 and 1010 form an adiabatic structure where optical signals transfer between the two waveguides with minimal or no coupling loss of the signal to other non-intended modes. Although FIGS. 10A and 10B illustrate that the widths of the tapers varying linearly, the waveguides can also taper in a non-linear fashion for example exponential or some higher order polynomial profile as long as the adiabatic criterion is satisfied. In one embodiment the distance between the first and second waveguides 1005 and 1010 is less than a micron. For example, the waveguides 1005, 1010 may be separated by 100 nanometers or less. The separation distance may affect the efficiency at which an optical signal may transfer between the waveguides 1005 and 1010, and thus, an SOI structure may be designed such that the waveguides 1005 and 1010 are as close as fabrication techniques allow.

FIG. 10B illustrates a top view of waveguides 1005 and 1010. By at least partially overlapping the waveguides 1005 and 1010, an optical signal may be transferred from a waveguide embedded in the insulation layer (e.g., the first tapered waveguide 1010) to a waveguide in the active surface layer (e.g., the second tapered waveguide 1005) of the SOI device. In one embodiment, the waveguides 1005 and 1010 only partially overlap where their respective ends begin to taper. The slope or change of the taper may depend on the material used for forming the waveguides 1005 and 1010. In one embodiment, at the widest point, the waveguides 1005 and 1010 may have a width that ranges from 200 nanometers to 2 microns. At the narrowest point, the waveguides 1005, 1010 may have a width from 100 nanometers to 200 nanometers. The length of the tapering portion may be in the range from 10 microns to 50 microns—e.g., around 20 micros.

Figure 11:
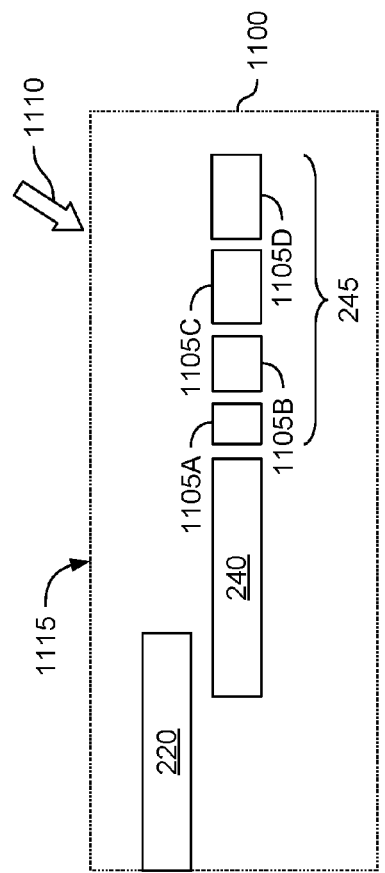
FIG. 11 illustrates an optical interface, according to one embodiment disclosed herein.

FIG. 11 illustrates a side view of an optical interface 245 for edge coupling which can be included in any of the photonic chips described above. Specifically, FIG. 11 illustrates a portion 1100 of the photonic chip 700 in FIG. 7. In this example, the optical interface 245 includes a plurality of individual waveguide portions 1105A-E that are spaced apart to create a grating. As shown, the lengths of the waveguide portions 1105 increase when moving from the right of the optical interface 245 to the left. In another embodiment the lengths and separations between the waveguide segments can remain same. In one embodiment, each of the waveguide portions 1105 have a length that is greater than 100 nanometers but less than one micron. Moreover, the separation distance between each of the waveguide portions 1105 may be greater than 100 nanometers but less than one micron.

As shown by arrow 1110, an external optical device can transmit (or receive) an optical signal via the coupling surface 260. 1105 may or may be 05In one embodiment, the grating formed by the waveguide portions 1105 changes the mode size of optical signals received from an external optical device such that the power of the optical signal is contained primarily in the optical coupler 240. As stated above in FIGS. 10A and 10B, the optical coupler 240 and the silicon waveguide 220 can be inversely tapered so that the optical signal is adiabatically transferred from the coupler 240 to the waveguide 220.

If the portion 1100 transfers optical signals from the photonic chip to an external device, the inverse taper between the silicon waveguide 220 and optical coupler 240 means that optical signals transmitted in the waveguide 220 are transmitted to the optical coupler 240. The grating formed by the waveguide portions 1105 changes the mode size (e.g., increases the mode size) to better match the dimensions of the external optical device (e.g., an optical fiber) that receives the optical signal via the coupling surface 260. In this manner, the efficiency of the coupling between the photonic chip and the external optical device is improved.

Figure 12:
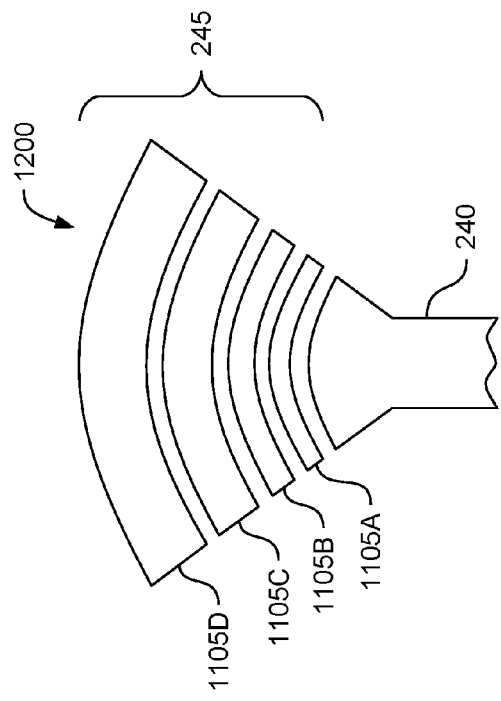
FIG. 12 illustrates a top view of the optical interface in FIG. 11, according to one embodiment disclosed herein.

FIG. 12 illustrates a top view 1200 of the optical interface 245 in FIG. 11, according to one embodiment disclosed herein. As shown, each of the waveguide portions 1105 is curved such that the width of the portions 1105 (i.e., the horizontal direction) increases the further away the portion 1105 is from the coupling surface 260.

In another embodiment the lengths and the separation between the waveguide segments can remain same. FIG. 13 illustrates a side view of an optical interface 245 which can be included in any of the photonic chips described above. Specifically, FIG. 13 illustrates a portion 1300 of the photonic chip 700 in FIG. 7 for edge coupling. In this example, the optical interface 245 includes a plurality of individual waveguide portions 1305A-E that are spaced apart to create a subwavelength grating. Unlike in FIG. 11, here, the lengths of the waveguide portions 1305 are shown to be substantially the same. In another embodiment these lengths can vary, e.g., decrease when going from left to right. In one embodiment, the waveguide portions 1305 have a length that is greater than 100 nanometers but less than one micron. Moreover, the separation distance between each of the waveguide portions 1305 may be greater than 100 nanometers but less than one micron.

As shown by arrow 1307, an external optical device can transmit (or receive) an optical signal via a coupling surface 1310. Unlike in FIG. 11, the coupling surface 260 is above the optical interface 245 instead of being located to the right of the optical interface 245. Furthermore, the arrow 1307 illustrates that the external optical device may be aligned at an angle relative to the coupling surface 1310. Put differently, the external optical device transmits or receives light across the coupling surface 1310 at an angle that is not perpendicular to the surface 1310.

In one embodiment, the grating formed by the waveguide portions 1305 changes the mode size of received optical signals such that the power of the optical signal is contained primarily in the optical coupler 240. As stated above in FIGS. 10A and 10B, the optical coupler 240 and the silicon waveguide 220 can be inversely tapered so that the optical signal is adiabatically transferred from the coupler 240 to the waveguide 220.

If the portion 1300 transfers optical signals from the photonic chip to an external device, the inverse taper between the silicon waveguide 220 and optical coupler 240 means that optical signals transmitted in the waveguide 220 are transmitted to the optical coupler 240. The grating formed by the waveguide portions 1305 changes the mode size (e.g., increases the mode size) to better match the dimensions of the external optical device (e.g., an optical fiber) that receives the optical signal via the coupling surface 260. In this manner, the efficiency of the coupling between the photonic chip and the external optical device is improved.

FIG. 14 illustrates a top view 1400 of the optical interface 245 in FIG. 13, according to one embodiment disclosed herein. As shown, each of the waveguide portions 1305 is curved such that the width of the portions 1305 increases the further away the portion 1305 is from side 1315 of the photonic chip. Unlike in FIG. 12, the lengths of the wavelength portions 1305 (i.e., the direction perpendicular to the side 1315) are the same. In another embodiment these lengths can vary, e.g., decrease when going from top to bottom. The separation between the waveguide segments can also be varied to achieve specific modal characteristics.

Figure 15:
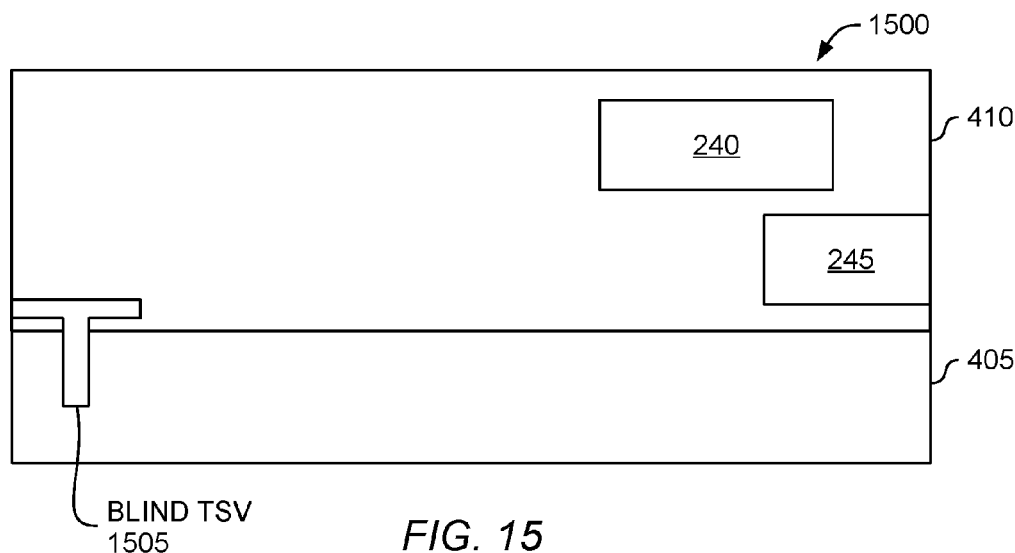
FIG. 15 illustrates a wafer with a blind through silicon via and an optical interface, according to one embodiment disclosed herein.

FIG. 15 illustrates a wafer 1500 with a blind TSV 1505 and an optical interface 245, according to one embodiment disclosed herein. The wafer 1500 can be the same as the wafer 400 in FIG. 4B except for the addition of the blind TSV 1505. In this example, the TSV 1505 is blind because it is surrounded by the semiconductor substrate 405. Stated differently, the tip of the blind TSV 1505 is not exposed at the bottom of the substrate 405. Moreover, the evanescent coupler 240 and the optical interface 245 can have any of the different waveguide structures described above.

Figure 16:
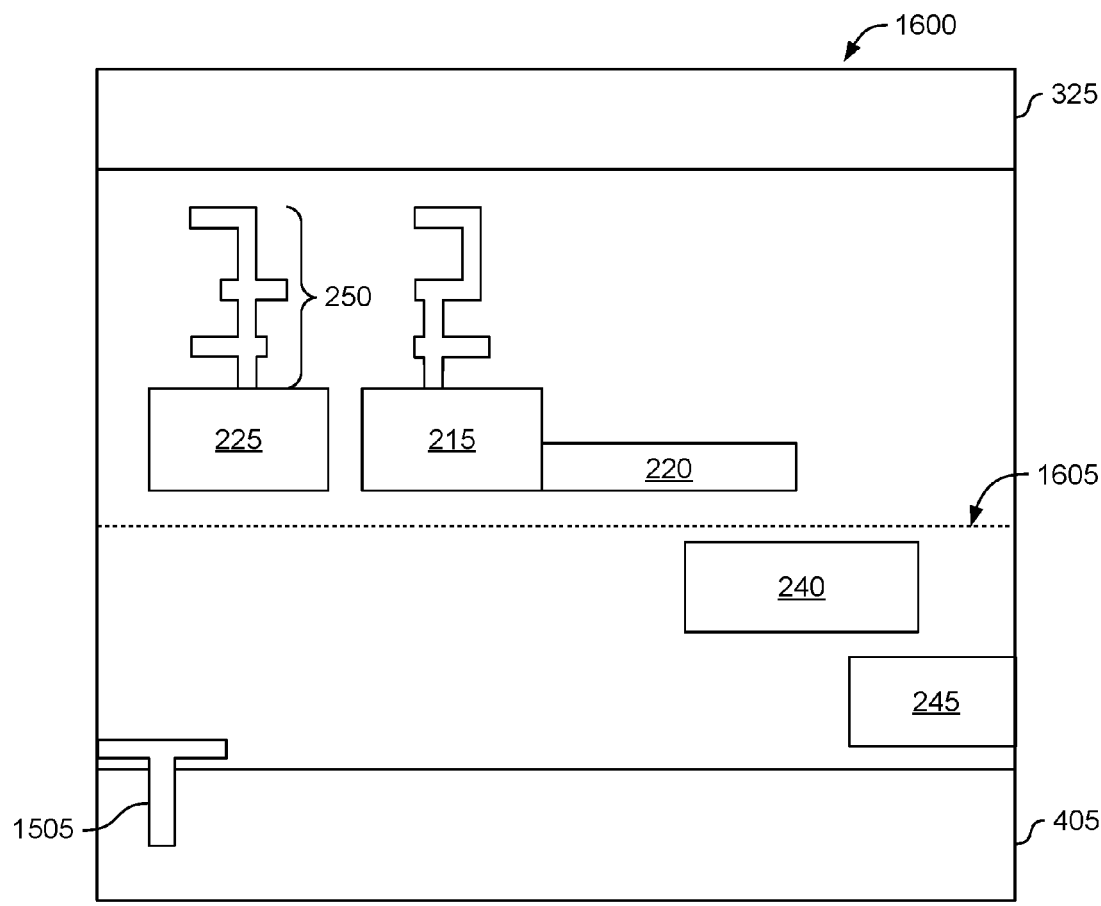
FIG. 16 illustrates combining the wafer in FIG. 15 with a photonic chip, according to one embodiment disclosed herein.

FIG. 16 illustrates combining the wafer 1500 in FIG. 15 with a photonic chip to form photonic chip 1600, according to one embodiment disclosed herein. In this example, the wafer 1500 is combined with the photonic chip 500 shown in FIG. 5 at a wafer bonding interface 1605. In one embodiment, an oxide-oxide bond is formed between the insulative material of photonic chip and the insulative material 410 of wafer 1500 to form the photonic chip 1600.

Figure 17:
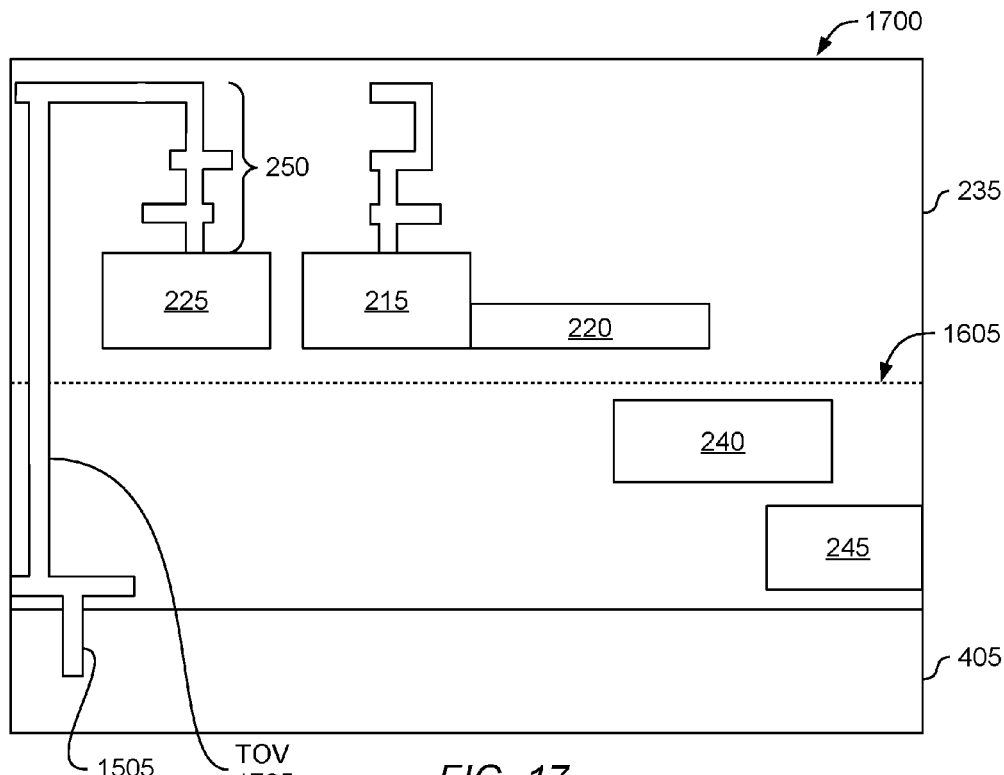
FIG. 17 illustrates forming a through oxide via to the photonic chip in FIG. 16, according to one embodiment disclosed herein.

FIG. 17 illustrates forming a TOV 1705 in the photonic chip 1600 in FIG. 16, according to one embodiment disclosed herein. In this embodiment, FIG. 17 illustrates a photonic chip 1700 where the TOV 1705 electrically couples the metal routing layers 250 to the blind TSV 1505. As such, the blind TSV 1505 is electrically coupled to the optical detector 225 via the TOV 1705 and the metal routing layers 250.

Moreover, FIG. 17 illustrates that the substrate 325 in photonic chip 1600 has been removed by, for example, using CMP. Although FIG. 17 illustrates that a thin layer of the insulative material 235 covers the top of the metal routing layers 250, in other embodiments, the top surface of the metal layers 250 is exposed when the TOV 1705 is formed between the top surface and the blind TSV 1505.

Figure 18:
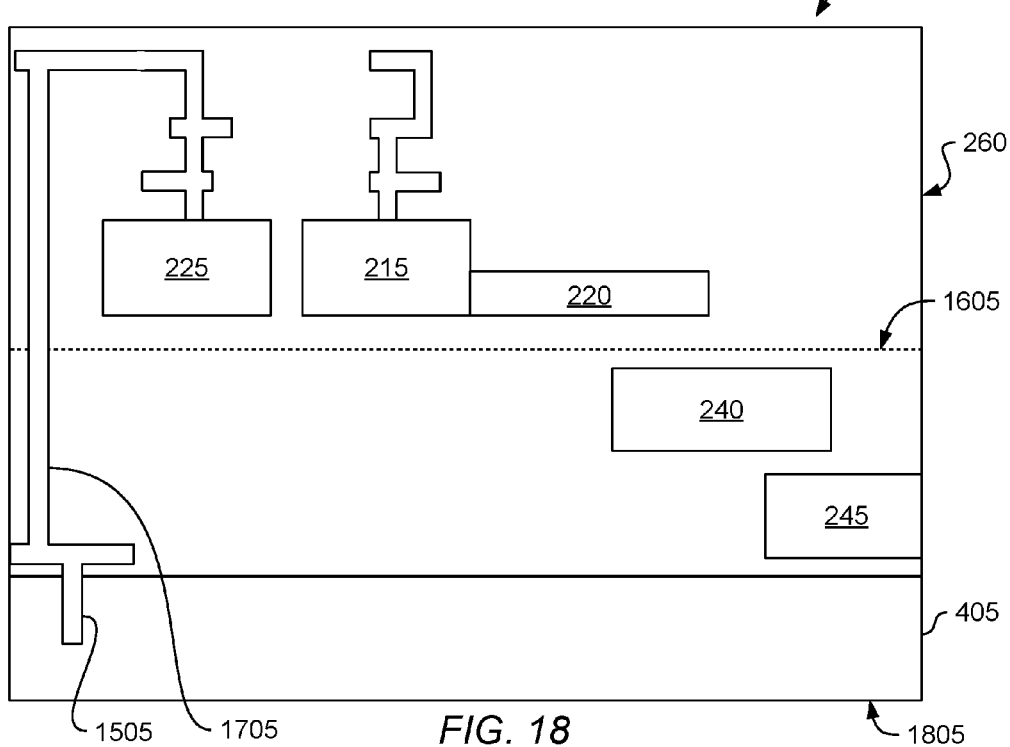
FIG. 18 illustrates exposing the blind through oxide via in the photonic chip shown in FIG. 17, according to one embodiment disclosed herein.

FIG. 18 illustrates exposing the blind TSV 1505 in a photonic chip 1800, according to one embodiment disclosed herein. Specifically, FIG. 18 illustrates removing a portion of the substrate 405 of the photonic chip 1700 in FIG. 17 until the blind TSV 1505 is exposed on a bottom surface 1805 of the substrate 405. Doing so enables an electrical connection to be made to separate device—e.g., an integrated circuit or FPGA. For example, the optical interface 245 permits the optical components in the photonic chip 1800 to couple to an external optical device at the coupling surface 260 on one side of the chip 1800 while a ball grid array can be coupled to a plurality of blind TSVs 1505 exposed on the bottom surface 1805 on a different side of the chip 1800. Using a ball grid array may permit the use of faster data signals than would otherwise not be possible using wire bonds. Thus, the optical interface 245 can be used to transmit or receive optical signals while the blind TSV 1505, TOV 1705 and metal routing layer 250 are used to route electrical signals for controlling the optical components in the photonic chip 1800 (e.g., detector 225 and/or modulator 215).

Figure 19A:
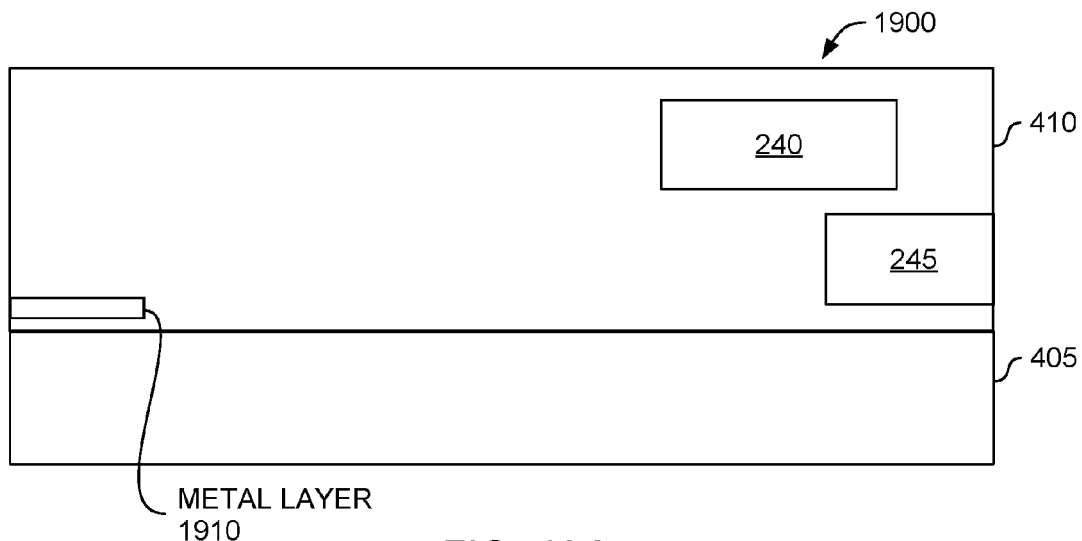
FIGS. 19A and 19B illustrate forming a through oxide via and through silicon via in a photonic chip, according to one embodiment disclosed herein.
Figure 19B:
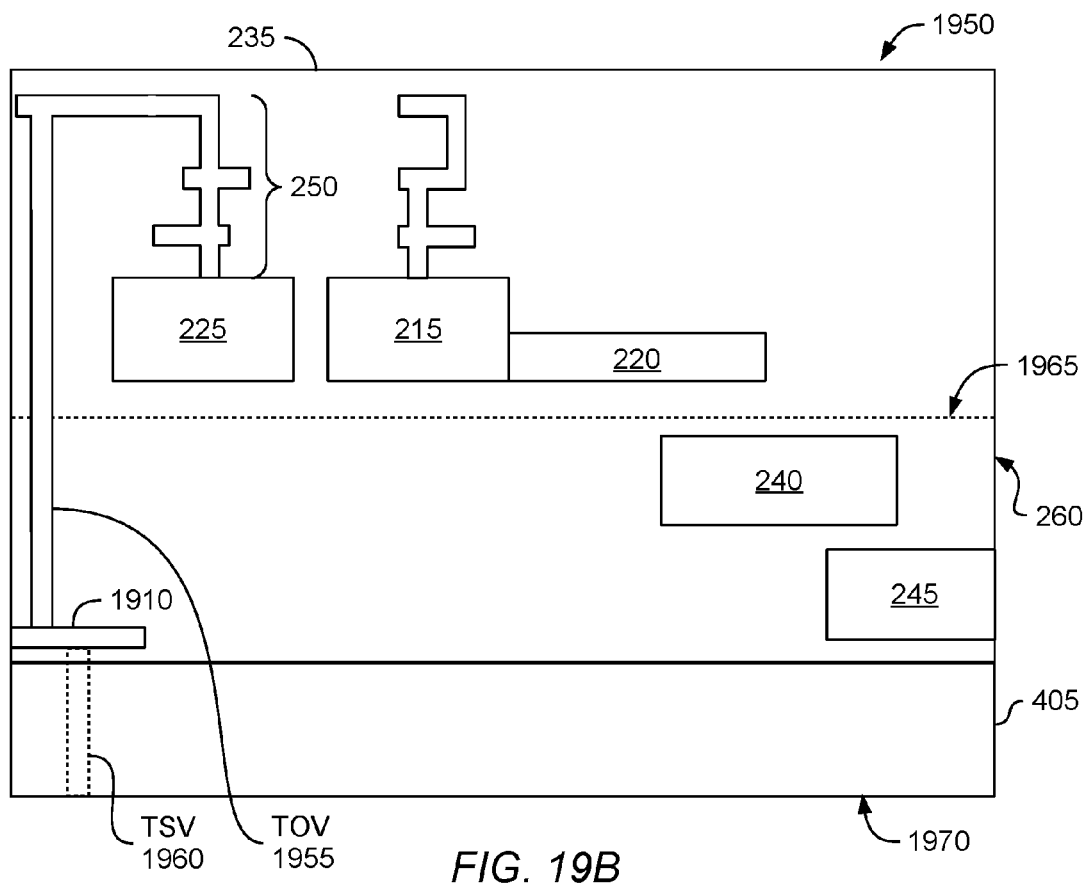

FIGS. 19A and 19B illustrate forming a TOV 1955 and TSV 1960 in a photonic chip, according to one embodiment disclosed herein. Specifically, FIG. 19A illustrates a wafer 1900 which can be the same as the wafer 400 in FIG. 4B except for the addition of the metal layer 1910. As discussed below, the metal layer 1910 provides an intermediate connection layer for electrically coupling a TOV extending through the insulative material 410 to a TSV extending through the crystalline semiconductor substrate 405 (e.g., a crystalline silicon substrate). Moreover, the evanescent coupler 240 and the optical interface 245 can have any of the different waveguide structures described above.

FIG. 19B illustrates a photonic chip 1950 that is formed using the wafer 1900 in FIG. 19A. For example, the wafer 1900 can be combined with the photonic chip 500 shown in FIG. 5 to result in the photonic chip 1950 shown in FIG. 19B. In one embodiment, an oxide-oxide bond is formed at the wafer bonding interface 1965 in order to join the two substrates. That is, the oxide-oxide bond is formed between the insulative material of the photonic chip and the insulative material 410 of wafer 1900 to form the photonic chip 1950.

Additionally, the photonic chip 1950 is processed to add the TOV 1955 which extends from a top layer of the metal routing layers 250 to the metal layer 1910. Furthermore, in a different processing step, the TSV 1960 (shown by dotted lines) can be added which couples to the metal layer 1910. Because the TSV 1960 is exposed on a bottom surface 1970 of the substrate 405, the TSV 1960 can be electrically connected to a separate device—e.g., an integrated circuit or FPGA—using a wire bond or a ball grid array or copper pillar attach process.

The optical interface 245 permits the optical components in the photonic chip 1950 to couple to an external optical device at the coupling surface 260 on one side of the chip 1950 while a ball grid array can be coupled to a plurality of TSVs 1960 exposed on the bottom surface 1970 on a different side of the chip 1950. Thus, the optical interface 245 can be used to transmit or receive optical signals while the TSV 1960, TOV 1955 and metal routing layer 250 are used to route electrical signals for controlling the optical components in the photonic chip 1950 (e.g., detector 225 and/or modulator 215).

Figure 20:
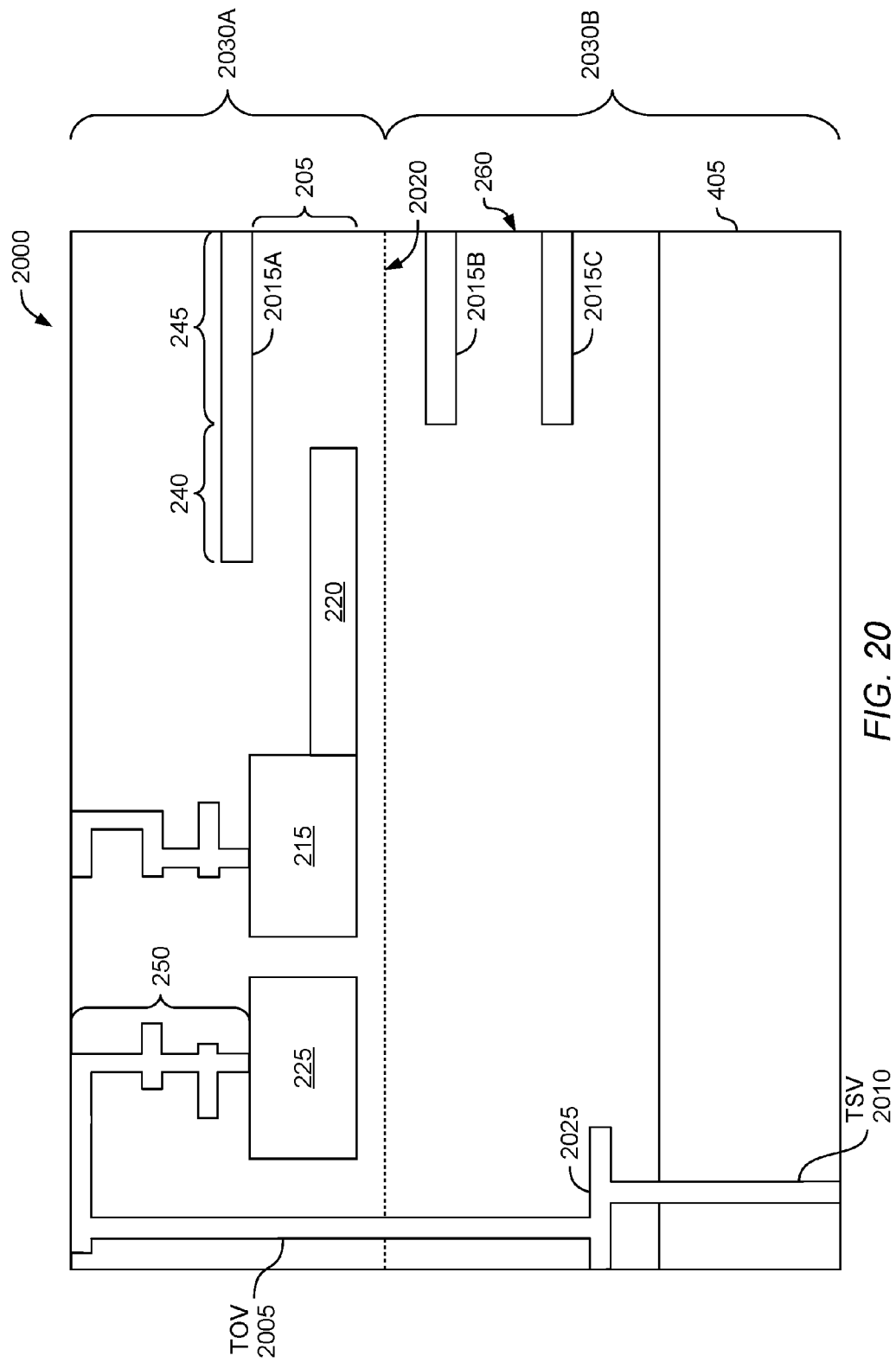
FIG. 20 illustrates a photonic chip with a through oxide via and a through silicon via, according to one embodiment disclosed herein.

FIG. 20 illustrates a photonic chip 2000 with a TOV 2005 and TSV 2010, according to one embodiment disclosed herein. As described above, the photonic chip 2000 is formed by forming an oxide-oxide bond along the wafer bonding interface 2020. The TOV 2005 is then formed which couples the metal routing layers 250 to the metal layer 2025. The TSV 2010 may either be formed before the oxide-oxide bond is formed as shown in FIGS. 15 and 16 or after the oxide-oxide bond is formed as shown in FIGS. 19A and 19B. However, unlike in these figures, here, the evanescent coupler 240 and at least a portion of the optical interface 245 are in a first substrate 2030A of the photonic chip above the interface 2020 of the oxide-oxide bond while the remaining portion of the optical interface 245 is in a second substrate 2030B of the chip 2000. Put differently, the silicon waveguide 220 is between the evanescent coupler 240 and the substrate 405 rather than the evanescent coupler 240 being between the silicon waveguide 220 and the substrate 405.

As shown, the optical interface 245 includes at least three waveguides 2015A-C which transmit or receive optical signals across the coupling surface 260. In one embodiment, the optical interface 245 may include four waveguides 2015 which form a prong structure similar to the one described in FIGS. 8 and 9A-C. However, instead of all the waveguides in the prong structure being below the wafer bonding interface 2020, here waveguide 2015A is above the interface 2020 while the remaining waveguides 2015B and 2015C are below the interface 2020. In one embodiment, the waveguides 2015 may have been formed using different processes. For example, because the waveguides 2015B and 2015C can be formed before the oxide-oxide bond is made between the substrates 2030A and 2030B, these waveguides 2015B-C may have been formed at higher deposition and anneal temperatures, and thus, have lower loss than waveguide 2015A which may be deposited and formed at lower temperatures.

Although FIG. 20 illustrates using the optical interface 245 to transmit or receive optical signals with an external optical device, in other embodiments, the waveguides 2015B-C below the bonding interface 2020 may be used to carry optical signals between silicon waveguides above the bonding interface 2020. For example, the waveguides 2015B-C may be used to receive an optical signal from the silicon waveguide 220, transmit the optical signal below the detector 225 and modulator 215, and then transmit the optical signal to another silicon waveguide that is on the same active layer 205 as waveguide 220 but is on the opposite side of the detector 225 and modulator 215. Put differently, the waveguides 2015B-C below the interface 2020 can be used as optical paths to move optical signals around to different portions of the active layer 205 of the photonic chip 2000. Advantageously, by transmitting optical signals below the active layer 205, the waveguides 2015B-C need only avoid the TOVs 2005 rather than trying to avoid the more complex routing layers 250 disposed above the active layer 205.

Figure 21:
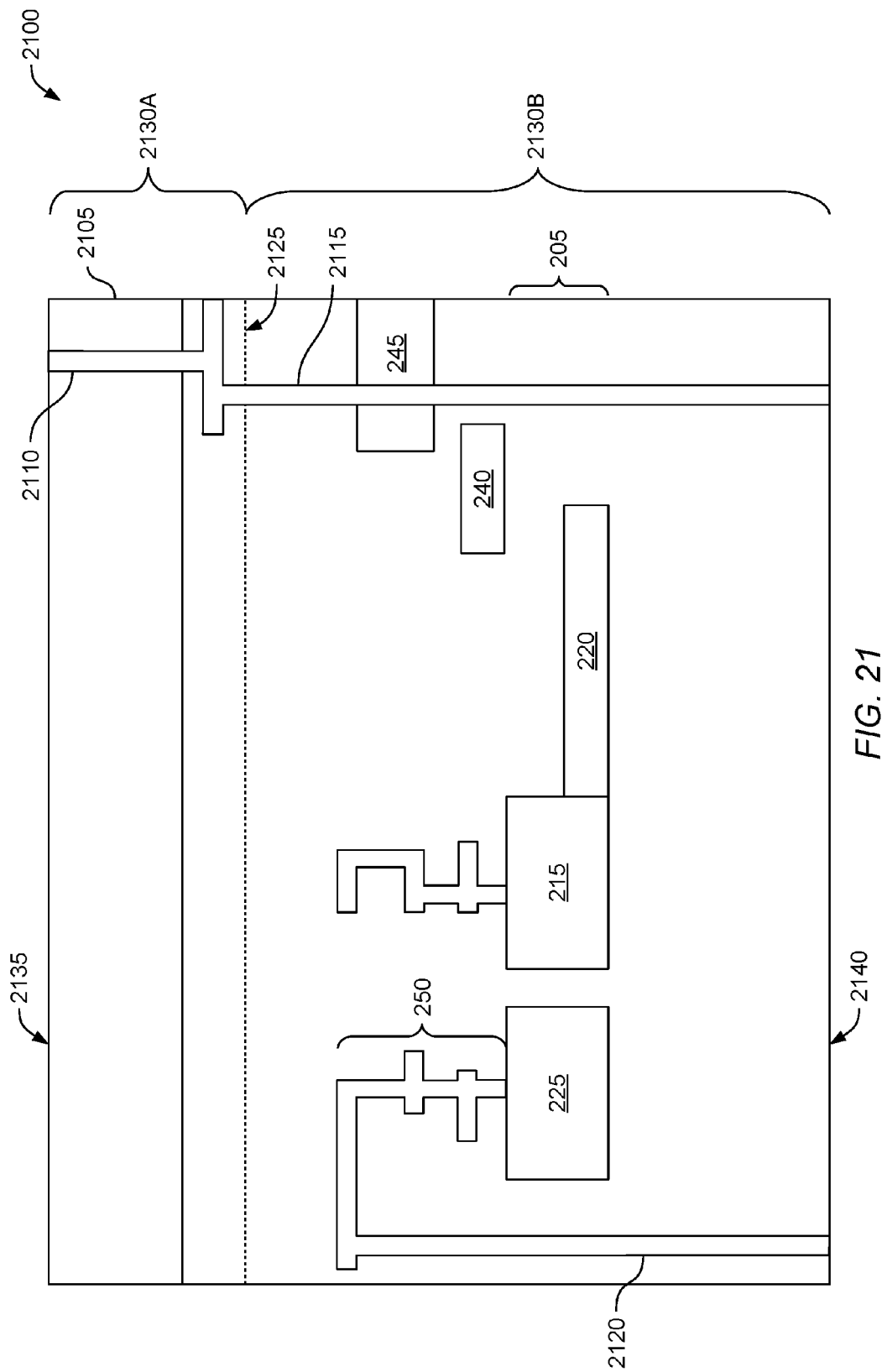
FIG. 21 illustrates a photonic chip with a through oxide via and a through silicon via, according to one embodiment disclosed herein.

FIG. 21 illustrates a photonic chip 2100, according to one embodiment disclosed herein. Unlike in FIG. 20, the photonic chip 2100 includes a wafer bonding interface 2125 (e.g., an oxide-oxide bond) between a first substrate 2130A and a second substrate 2130B that is above the active layer 205 rather than below as shown in photonic chip 2000. Before the two substrates 2130 are bonded, the first substrate 2130A may have been a separate wafer that included a crystalline silicon substrate 2105 and a TSV 2110. After bonding the two substrates 2130, a TOV 2115 is formed to electrically connect a top surface 2135 of the photonic chip 2100 to a bottom surface 2140. Moreover, before or after the two substrates 2130 are bonded together, a TOV 2120 is formed which electrically couples the metal routing layer 250 to the bottom surface 2140 of the photonic chip 2100. In one example, an integrated circuit can be coupled to the TSV 2110 at the top surface 2135 while a PCB or other electrical routing medium can be coupled to TOV 2115 and 2120 at the bottom surface 2140. The electrical routing medium can electrically couple TOV 2115 to TOV 2120. As a result, electrical signals introduced at the top surface 2135 can be routed to the bottom surface 2140 via TSV 2110 and TOV 2115 and then routed to the TOV 2120 and the metal routing layers 250 by the electrical routing medium.

In photonic chip 2100, the evanescent coupler 240 and the optical interface 245 are disposed in the same layers as the metal routing layers 250 and/or the vias connecting the metal routing layers 250. That is, instead of at least a portion of the optical interface 245 being disposed in the first substrate 2130A which is then bonded to the second substrate 2130B at the interface 2125, the entire optical interface 245 is disposed in the second substrate 2130B. Although FIG. 21 illustrates that the TOV 2115 extends through the optical interface 245, in other example, the TOV 2115 would be shifted in a direction into or out of the page to avoid crossing the optical interface 245.

Although FIG. 21 illustrates using the optical interface 245 to transmit or receive optical signals with an external optical device, in other embodiments, the waveguides in the evanescent coupler 240 or the optical interface 245 may be used to transmit optical signals between silicon waveguides in the active surface layer 205. For example, the evanescent coupler 240 and/or the optical interface 245 may be used to receive an optical signal from the silicon waveguide 220, transmit the optical signal through (or over) the metal routing layers 250, and then transmit the optical signal to another silicon waveguide in the active layer 205 that is on the opposite side of the detector 225 and modulator 215.

In the preceding, reference is made to embodiments presented in this disclosure. However, the scope of the present disclosure is not limited to specific described embodiments. Instead, any combination of the features and elements described above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s).

In view of the foregoing, the scope of the present disclosure is determined by the claims that follow.

We claim:

1. A photonic chip comprising:
   a first substrate, comprising:
     a crystalline semiconductor substrate, and
     a through silicon via (TSV) extending through the crystalline semiconductor substrate;
   a second substrate bonded to the first substrate at a wafer bonding interface, the second substrate, comprising:
     an active surface layer comprising an optical component optically coupled to a semiconductor waveguide;
     a through oxide via (TOV) formed in both the first and second substrates, wherein the TOV crosses the wafer bonding interface and is electrically coupled to the TSV, wherein a first end of the TSV is coupled to a metal layer in the first substrate and a second end of the TSV is exposed on a first external surface, and wherein a first end of the TOV is coupled to the metal layer in the first substrate and a second end of the TOV is exposed on a second external surface opposite the first external surface;
     an evanescent coupler spaced apart from the semiconductor waveguide along a direction normal to the active surface layer, wherein the evanescent coupler is optically coupled to the semiconductor waveguide; and
     an optical interface optically coupled to the evanescent coupler, wherein the optical interface permits optical signals to be transferred between the photonic chip and an external optical device via a coupling surface.

2. The photonic chip of claim 1, wherein a first end of the TSV is coupled to a metal layer in the first substrate and a second end of the TSV is exposed on an external surface of the semiconductor substrate, and wherein a first end of the TOV is coupled to the metal layer in the first substrate and a second end of the TOV is electrically coupled to the optical component.

3. The photonic chip of claim 2, wherein the TOV and TSV provide an electrical path for transmitting data signals for controlling the optical component, wherein the optical component is one of an optical modulator and an optical detector.

4. The photonic chip of claim 1, wherein a first end of the TSV is coupled to a metal layer in the first substrate and a second end of the TSV is exposed on a first external surface, and wherein a first end of the TOV is coupled to the metal layer in the first substrate and a second end of the TOV is exposed on a second external surface opposite the first external surface.

5. The photonic chip of claim 1, wherein the wafer bonding interface comprises an oxide-oxide bond between insulative material in the first and second substrates.

6. The photonic chip of claim 1, wherein at least a portion of the optical interface is disposed in the first substrate.

7. The photonic chip of claim 6, wherein evanescent coupler is disposed in the first substrate, wherein the optical interface and the evanescent coupler comprises respective waveguides formed from at least one of silicon nitride and silicon oxynitride.

8. The photonic chip of claim 6, wherein the optical interface comprises at least four waveguides, wherein each of the four waveguides change width as the four waveguides extend away from the coupling surface.

9. The photonic chip of claim 1, wherein the optical interface comprises a plurality of waveguides forming a grating structure, wherein each of the plurality of waveguides is spaced apart from a neighboring waveguide.

10. The photonic chip of claim 1, wherein the optical interface comprises a subwavelength grating that permits edge coupling.

* * * * *